US012778129B2

(12) United States Patent
de Alfonso Marzal et al.

(10) Patent No.: US 12,778,129 B2
(45) Date of Patent: Nov. 3, 2026

(54) INSECT ATTRACTANT AND KILLING SYSTEM

(71) Applicant: Suterra, LLC, Los Angeles, CA (US)

(72) Inventors: Ignacio de Alfonso Marzal, Valencia (ES); Zachary Ryan Clark, Bend, OR (US); Scott Richard Lindbloom, Bend, OR (US); Wesley Albert Matson, Bend, OR (US)

(73) Assignee: Suterra, LLC, Los Angeles, CA (US)

( * ) Notice: Subject to any disclaimer, the term of this patent is extended or adjusted under 35 U.S.C. 154(b) by 192 days.

(21) Appl. No.: 18/951,373

(22) Filed: Nov. 18, 2024

(65) Prior Publication Data

US 2025/0072427 A1 Mar. 6, 2025

Related U.S. Application Data

(62) Division of application No. 17/340,612, filed on Jun. 7, 2021, now Pat. No. 12,178,210.

(60) Provisional application No. 63/035,914, filed on Jun. 8, 2020.

(51) Int. Cl.
*A01N 59/00* (2006.01)
*A01M 1/20* (2006.01)
*A01N 25/34* (2006.01)
*A01N 37/38* (2006.01)

(52) U.S. Cl.
CPC ............. *A01N 59/00* (2013.01); *A01N 25/34* (2013.01); *A01N 37/38* (2013.01); *A01M 1/2016* (2013.01)

(58) Field of Classification Search
CPC ........ A01N 59/00; A01N 25/34; A01N 37/38; A01M 1/2016
See application file for complete search history.

(56) References Cited

U.S. PATENT DOCUMENTS

| | | | |
|---|---|---|---|
| 4,947,578 | A | 8/1990 | Anderson et al. |
| 6,780,507 | B2 | 8/2004 | Toreki et al. |
| 7,856,753 | B2 | 12/2010 | Fisher |
| 8,029,822 | B2 | 10/2011 | Faour et al. |
| 8,418,399 | B2 | 4/2013 | Palencia-Adrubau et al. |
| 8,470,881 | B2 | 6/2013 | Durand et al. |
| 8,484,887 | B2 | 7/2013 | Schneidmiller et al. |
| 8,753,676 | B2 | 6/2014 | Kritzman et al. |
| 8,911,756 | B2 | 12/2014 | Beitzel et al. |
| 10,178,860 | B2 | 1/2019 | Wesson et al. |
| 2002/0192123 | A1 | 12/2002 | Chen |
| 2005/0008702 | A1 | 1/2005 | Faour et al. |
| 2006/0177507 | A1 | 8/2006 | Faour et al. |
| 2007/0071786 | A1 | 3/2007 | Fisher |
| 2009/0313883 | A1 | 12/2009 | Olson et al. |
| 2013/0288897 | A1 | 10/2013 | Babcock et al. |
| 2014/0335140 | A1 | 11/2014 | Hoag et al. |
| 2016/0106088 | A1 | 4/2016 | Lawrence et al. |
| 2017/0273290 | A1 | 9/2017 | Jay |
| 2018/0116198 | A1 | 5/2018 | Manhas et al. |

FOREIGN PATENT DOCUMENTS

| | | |
|---|---|---|
| EP | 3127426 A1 | 2/2017 |

OTHER PUBLICATIONS

European Patent Office Action for Application No. 21740296.5 dated Jun. 10, 2025 (4 pages).
AO Midori Biocontrol, "Control of Bactrocera oleae Olive fruit fly AMPHOS-DACUS", Informational Flyer, 2014, 2 pages.
International Preliminary Report on Patentability for Application No. PCT/US2021/036125 dated Dec. 13, 2022 (8 pages).
International Search Report and Written Opinion for Application No. PCT/US2021/036125 dated Sep. 28, 2021 (15 pages).
Sedq, "Flypack Dacus: Use in mass trapping for the management of the olive fruit fly *Bactrocera oleae*", Product information; available at <https://sedq.es/en/producto/flypack-dacus/>, accessed Feb. 2020, 2 pages.
W.L. Yee. "Ammonium carbonate loss rates from lures differentially affect trap captures of Rhagoletis indifferens (Diptera: Tephritidae) and non-target flies," Can. Entomol. 149: 241-250 (2017) (Year: 2017).
European Patent Office Action for Application No. 21740296.5 dated May 4, 2026 (5 pages).

*Primary Examiner* — Michael P Cohen
(74) *Attorney, Agent, or Firm* — Michael Best & Friedrich LLP

(57) ABSTRACT

Described herein are systems and methods for attracting insects to a trap or surface containing insecticide. One embodiment described herein is an insect attractant releasing system comprising a quantity of a volatile insect attractant where the attractant is released at a defined rate and has a particular product lifetime under field conditions. In another embodiment, the attractant releasing system is integrated into an apparatus having insecticide immobilized on one or more surfaces where attracted insects can crawl or land and contact the insecticide, which subsequently kills the insects.

19 Claims, 19 Drawing Sheets

Decomposition Scheme for Ammonium Carbonate:

$$(NH_4)_2CO_3\ (s) \rightarrow [\ NH_3\ (g) + NH_4HCO_3\ (s)\ ] \rightarrow 2\ NH_3\ (g) + H_2O\ (g) + CO_2\ (g)$$

INSECT ATTRACTANT AND KILLING SYSTEM

CROSS-REFERENCE TO RELATED APPLICATIONS

This application is a divisional of U.S. patent application Ser. No. 17/340,612, filed on Jun. 7, 2021, which claims priority to U.S. Provisional Application No. 63/035,914, filed on Jun. 8, 2020, each of which is incorporated by reference herein in its entirety.

TECHNICAL FIELD

Described herein are systems and methods for attracting insects to a trap or surface containing insecticide. One embodiment described herein is an insect attractant releasing system comprising a quantity of a volatile insect attractant where the attractant is released at a defined rate and has a particular product lifetime under field conditions. In another embodiment, the attractant releasing system is integrated into an apparatus having insecticide immobilized on one or more surfaces where attracted insects can crawl or land and contact the insecticide, which subsequently kills the insects.

BACKGROUND

Fruit flies are devastating pests in orchard crops worldwide. In many areas these insects cause significant economic losses to growers by damaging the fruit products. The most common method for protecting crops from insect pests is use of insecticidal sprays. Spray insecticides have drawbacks such as requiring large quantities of the insecticide, the labor and time required to apply the spray, the possibility of the insecticide being washed off during rain, and potential negative effects on the environment and human health. Insect control with spray methods is not sustainable and there is a need for new insect control methods. The attract and kill method is one such solution.

Attract and kill systems use attractants to lure insects to a device, where the insects contact an insecticide and are killed. The systems rely on an attractant to lure the insects to the insecticide. Hydrolyzed proteins and/or yeasts are sometimes used as attractants, but they lack specificity and are cumbersome to use. In general, these attractants are liquids placed inside reservoirs of hollow traps. Such devices are bulky, require continual maintenance and filling, and are unpractical for large scale use in commercial orchards.

Many fruit fly species are attracted to ammonia and various ammonium salts have been used to lure them to traps. Aqueous bisammonium phosphate has been used, but it typically only lasts for approximately two weeks with optimum performance. This requires regular refiling of the attractant throughout the growing season, a time consuming and labor-intensive task. Other systems have used ammonium salt-polymer mixtures or ammonia salts such as ammonium bicarbonate. The ammonium polymers are expensive and ammonium salts typically only last for a few weeks before needing refiling.

Accordingly, there is a need for an insect attractant system and an insect attract and kill system that slowly release economical chemical attractants over long periods of time.

SUMMARY

One embodiment described herein is a system for attracting insects, the system comprising: an attractant receptacle enclosing a quantity of a volatile insect attractant, the receptacle comprising one or more orifices having a defined diameter, the one or more orifices being covered by a permeable membrane; where the receptacle passively releases the volatile insect attractant through the permeable membrane covering the one or more orifices; and the quantity of the volatile insect attractant is released over a period of 1 day to over 1 year. In one aspect, the volatile insect attractant is released over a period of about: 15 days, 1 month, 2 months, 3 months 4 months, 5 months, 6 months, 7 months, 8 months, 9 months, 10 months, 11 months, 12 months, 13 months, 14 months, 15, months, 16 months, 17 months, or 18 months. In another aspect, the volatile insect attractant is released over a period of about 60 days to about 540 days; about 60 days to about 450 days; about 60 days to about 360 days, about 60 days to about 300 days; about 60 days to about 270 days; about 60 days to about 180 days; about 60 days to about 120 days; or about 60 days to about 90 days. In another aspect, the volatile insect attractant is released at a rate of about: 10 mg/day, 25 mg/day, 50 mg/day, 75 mg/day, 100 mg/day, 125 mg/day, 150 mg/day, 175 mg/day, 200 mg/day, 225 mg/day, 250 mg/day, 275 mg/day, 300 mg/day, 325 mg/day, 350 mg/day, 375 mg/day, 400 mg/day, 425 mg/day, 450 mg/day, 475 mg/day, 500 mg/day, 525 mg/day, 550 mg/day, 575 mg/day, 600 mg/day, 625 mg/day, 650 mg/day, 675 mg/day, 700 mg/day, 725 mg/day, 750 mg/day, 775 mg/day, 800 mg/day, 825 mg/day, 850 mg/day, 875 mg/day, 900 mg/day, 925 mg/day, 950 mg/day, 975 mg/day, or 1000 mg/day. In another aspect, the volatile insect attractant is released at a rate of about 1 mg to about 800 mg per day. In another aspect, the volatile insect attractant is released at a rate of about 10 mg to about 300 mg per day. In another aspect, the volatile insect attractant comprises one or more of ammonium carbonate, ammonium carbamate, ammonium bicarbonate, ammonium phosphate, ammonium nitrate, ammonium sulfate, ammonium persulfate, ammonium perchlorate, ammonium acetate, ammonium lactate, ammonium citrate, or other ammonium salts. In another aspect, the volatile insect attractant comprises one or more of ammonium carbonate, ammonium carbamate, or ammonium bicarbonate. In another aspect, the quantity of the volatile insect attractant comprises about 5 g to about 100 g. In another aspect, the quantity of the volatile insect attractant comprises about 5 g to about 25 g. In another aspect, the permeable membrane comprises a microporous film of polyethylene, polypropylene, polyethylene terephthalate, or polyester. In another aspect, the permeable membrane comprises a microporous film of polyethylene or polypropylene. In another aspect, the defined diameter of the orifice is about 1 mm to about 40 mm. In another aspect, the defined diameter of the orifice is about 1 mm to about 5 mm. In another aspect, the defined diameter of the orifice is about 2 mm to about 4 mm. In another aspect, the permeable membrane is affixed it to the attractant receptacle with a ring seal. In another aspect, the attractant receptacle comprises a sealable sleeve comprising one or more of polyvinyl chloride, polyester, polyethylene, polypropylene, polyethylene terephthalate, polyether ether ketone, fluoropolymer, ethylene vinyl acetate, nylon, or aluminum. In another aspect, the attractant receptacle comprises a sealable sleeve comprising polyvinyl chloride, polyethylene, or polyester. In another aspect, the attractant receptacle comprises a sealable sleeve comprising polyethylene or polyester; the receptacle comprises one or more orifices having a defined diameter of about 2 mm to about 4 mm; the one or more orifices are covered by a permeable membrane comprising a microporous film of polyethylene or polypropylene; the volatile insect attractant comprises about 5 g to about 25 g of one or more of ammonium carbonate, ammonium carbamate, or ammonium bicarbonate; the volatile insect attractant is released over a period of about 90 days to about 480 days; and the volatile insect attractant is released at a rate of about 1 mg to about 800 mg per day.

Another embodiment described herein is a method for attracting insects, the method comprising: releasing a quantity of volatile insect attractant from a receptable comprising one or more membranous orifices having a defined diameter; wherein the quantity of the volatile insect attractant is released over a period of 1 day to over 1 year. In one aspect, the volatile insect attractant is released at a rate of about 1 mg to about 800 mg per day. In another aspect, the receptacle comprises a sealable sleeve comprising polyethylene and polyester. In another aspect, the receptacle comprises one or more orifices having a defined diameter of about 2 mm to about 4 mm. In another aspect, the one or more orifices are covered by a permeable membrane comprising a microporous film of polyethylene or polypropylene. In another aspect, the volatile insect attractant comprises about 5 g to about 25 g of one or more of ammonium carbonate, ammonium carbamate, or ammonium bicarbonate. In another aspect, the insects comprise one or more of the genera *Anastrepha, Bactrocera, Ceratitis, Dacus, Drosophila, Rhagoletis*, or *Vidalia*. In another aspect, the insects comprise one or more of South American fruit fly (*Anastrepha fraterculus*), Mexican fruit fly (*Anastrepha ludens*), Oriental fruit fly (*Bactrocera dorsalis*), Melon fly (*Bactrocera cucurbitae*), Olive fruit fly (*Bactrocera oleae*), Queensland fruit fly (*Bactrocera tryoni*), Peach fruit fly (*Bactrocera zonata*), Mediterranean fruit fly (*Ceratitis capitata*), common fruit fly, (*Drosophila melanogaster*), Spotted-wing *drosophila* (*Drosophila suzukii*), European cherry fruit fly (*Rhagoletis cerasi*), Walnut husk fly (*Rhagoletis* complete), or apple maggot (*Rhagoletis pomonella*).

Another embodiment described herein is a means for attracting insects comprising: a means for enclosing and passively releasing a volatile insect attractant; wherein the volatile insect attractant is released over a period of 1 day to over 1 year. In one aspect, the volatile insect attractant is released at a rate of about 10 mg to about 800 mg per day.

Another embodiment described herein is the use of an insect attractant system comprising: attracting insects to a surface by a means for enclosing and passively releasing a volatile insect attractant; wherein the volatile insect attractant is released over a period of 1 day to over 1 year. In one aspect, the volatile insect attractant is released at a rate of about 10 mg to about 800 mg per day.

Another embodiment described herein is a method for manufacturing an insect attractant system, the method comprising: inserting a quantity of a volatile insect attractant into a receptacle envelope and sealing the receptable envelop, wherein the attractant receptacle envelop comprises one or more orifices of a defined diameter, the one or more orifices being covered by a permeable membrane.

Another embodiment described herein is an insect attractant system manufactured by a method described herein.

Another embodiment described herein is a kit for attracting insects comprising: an attractant receptable enclosing a quantity of a volatile insect attractant, the attractant receptacle comprising one or more orifices of a defined diameter, the one or more orifices being covered by a permeable membrane; the permeable membrane being covered by a removable seal; a sealed package for enclosing the attractant receptacle; optionally, instructions or directions for use.

Another embodiment described herein is a system for attracting and killing insects, the system comprising: an insecticide transfer envelope comprising exterior and interior surfaces, with an insecticide immobilized on the exterior surface, and enclosing within the interior an attractant receptacle enclosing a quantity of a volatile insect attractant, the attractant receptacle comprising one or more orifices of a defined diameter, the one or more orifices being covered by a permeable membrane; where the receptacle passively releases the volatile insect attractant through the permeable membrane covering the one or more orifices; and the volatile insect attractant is released over a period of 1 day to over 1 year. In one aspect, the volatile insect is released at a rate of about 1 mg to about 800 mg per day. In another aspect, the insecticide transfer envelope comprises a folded, two-sided surface, with at least one opening, at least one vent, and having a hook affixed to at least one surface edge. In another aspect, the insecticide comprises one or more of pyrethroids, organochlorides, organophosphates, carbamates, neonicotinoids, ryanoids, spinosyns, or sulfoximines. In another aspect, the insecticide comprises one or more pyrethroids. In another aspect, about 5 mg to about 20 mg of insecticide is immobilized on the surface of the insecticide transfer envelope. In another aspect, the attractant receptacle comprises a sealable sleeve comprising polyethylene or polyester; the receptacle comprises one or more orifices having a defined diameter of about 2 mm to about 4 mm; the one or more orifices are covered by a permeable membrane comprising a microporous film of polyethylene or polypropylene; the volatile insect attractant comprises about 5 g to about 25 g of one or more of ammonium carbonate, ammonium carbamate, or ammonium bicarbonate; the insecticide comprises one or more pyrethroids; about 5 mg to about 20 mg of insecticide is immobilized on the surface of the insecticide transfer envelope; the volatile insect attractant is released over a period of about 30 days to about 480 days; and the volatile insect attractant is released at a rate of about 10 mg to about 800 mg per day.

Another embodiment described herein is a system for attracting and killing insects, the system comprising: an insecticide transfer envelope comprising exterior and interior surfaces, with an insecticide immobilized on the exterior surface, and enclosing within the interior an attractant receptacle enclosing a quantity of a volatile insect attractant, the attractant receptacle comprising one or more orifices of a defined diameter, the one or more orifices being covered by a permeable membrane; where the receptacle passively releases the volatile insect attractant through the permeable membrane covering the one or more orifices and through one or more vents positioned on the insecticide transfer envelope; and the volatile insect attractant is released over a period of 1 day to over 1 year.

Another embodiment described herein is a system for attracting and killing insects, the system comprising: an insecticide transfer envelope comprising exterior and interior surfaces, with an insecticide immobilized on the exterior surface, and enclosing within the interior a quantity of a volatile insect attractant, the insecticide transfer envelope comprising one or more orifices of a defined diameter, the one or more orifices being covered by a permeable membrane; where the insecticide transfer envelope passively releases the volatile insect attractant through the permeable membrane covering the one or more orifices; and the volatile insect attractant is released over a period of 1 day to over 1 year.

Another embodiment described herein is a method for attracting and killing insects, the method comprising:

attracting insects to an insecticide transfer surface having one or more insecticides dispersed thereon by passively releasing a volatile insect attractant from an attractant receptable enclosing a quantity of a volatile insect attractant, the attractant receptacle comprising one or more orifices of a defined diameter, the one or more orifices being covered by a permeable membrane; wherein the volatile insect attractant is released over a period of 1 day to over 1 year; whereby when an insect contacts the insecticide transfer surface, insecticide is transferred to the insect and effectuates the killing of the insect. In one aspect, the volatile insect attractant is released a rate of about 10 mg to about 800 mg per day.

Another embodiment described herein is a means for attracting and killing insects comprising: attracting insects to a surface having one or more insecticides dispersed thereon by a means for enclosing and passively releasing a volatile insect attractant, wherein the volatile insect attractant is released over a period of 1 day to over 1 year; whereby when an attracted insect contacts the surface, insecticide is transferred thereto and effectuates the killing of the insect. In one aspect, the volatile insect attractant is released at a rate of about 10 mg to about 800 mg per day.

Another embodiment described herein is the use of an insect attractant and killing system comprising: attracting insects to a surface having one or more insecticides dispersed thereon by a means for enclosing and passively releasing a volatile insect attractant, wherein the volatile insect attractant is released over a period of 1 day to over 1 year; whereby when an attracted insect contacts the surface, insecticide is transferred thereto and effectuates the killing of the insect. In one aspect, the volatile insect attractant is released at a rate of about 10 mg to about 800 mg per day.

Another embodiment described herein is a kit for attracting and killing insects comprising: an insecticide transfer envelope comprising exterior and interior surfaces, with an insecticide disposed on the exterior surface; an attractant receptable enclosing a quantity of a volatile insect attractant, the attractant receptacle comprising one or more orifices of a defined diameter, the one or more orifices being covered by a permeable membrane; the permeable membrane being covered by a removable seal; a sealed package for enclosing the attractant receptacle; optionally, gloves for an end user; and optionally, instructions or directions for use.

DESCRIPTION OF THE DRAWINGS

FIG. 1A. shows a schematic of an exemplary attractant receptible. FIG. 1B shows a photograph of an exemplary embodiment of an attractant receptacle.

FIG. 2A shows a schematic of an exemplary insecticide transfer envelope. FIG. 2B shows a photograph of an exemplary insecticide transfer envelope.

FIG. 3A shows a schematic of an exemplary insecticide transfer envelope illustrating the envelope sheet prior to folding. FIG. 3B shows a photograph of an exemplary insecticide transfer envelope as folded to enclose the attractant receptacle.

FIG. 4A. shows an exemplary embodiment of an attract and kill system with the typical components, including an exemplary insecticide transfer envelope, an exemplary attractant receptacle containing a volatile insect attractant, an exemplary insecticide disposed on the surface of the insecticide transfer envelope, and a hook for deploying the attract and kill system in the field. FIG. 4B shows a photograph of an exemplary attract and kill system deployed in a fruit tree.

FIG. 5A shows an alternative exemplary embodiment of an attract and kill system with the typical components, including an exemplary insecticide transfer envelope, an exemplary attractant receptacle containing a volatile insect attractant, an exemplary insecticide disposed on the surface of the insecticide transfer envelope, and a hook for deploying the attract and kill system in the field. FIG. 5B shows an exemplary bottom view of the attract and kill system.

FIG. 16A shows the decomposition scheme for ammonium carbonate. FIG. 16B shows the average mass loss of ~15 g of ammonium carbonate in the field using a microporous polypropylene membrane (Aptra UV8) with a 1.6 mm (1/16 in) orifice size. The study was conducted from June through November 2019 in Córdoba, Spain. Data are shown in Table 8.

FIG. 17A shows the average remaining mass loss of ~17 g of ammonium carbamate or ammonium carbonate in the field using a microporous polypropylene membrane (Aptra UV8) with a 1.6 mm (1⁄16 in) orifice size. FIG. 17B shows the average remaining mass loss of the same samples shown in FIG. 17A. FIG. 17C shows the average release rate of the same samples shown in FIG. 17A-B. FIG. 17D shows the average ammonia release rate from the ammonium carbamate or ammonium carbonate attractant shown in FIG. 17A-C. The average temperatures for the period are plotted on the right y-axes. Data are shown in Tables 9-11.

FIG. 18A shows the efficacy of reducing olive fruit flies in olive groves. FIG. 18B shows the efficacy of reducing walnut husk flies in walnut groves. Data are shown in Tables 12-13.

DETAILED DESCRIPTION

Figure 1A:
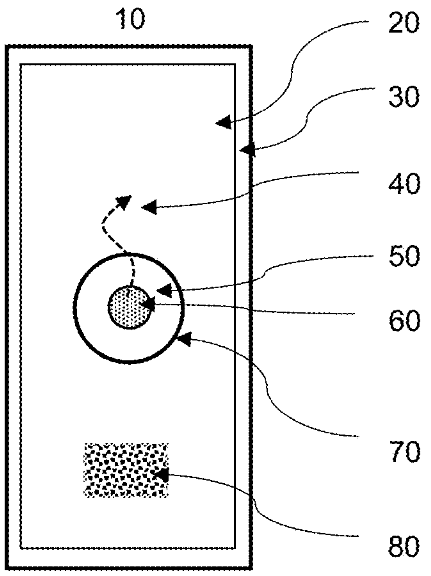
FIG. 1A-B show an exemplary attractant receptacle.

Unless otherwise defined, all technical and scientific terms used herein have the same meaning as commonly understood by one of ordinary skill in the art. For example, any nomenclatures used in connection with, and techniques of chemistry, entomology, materials science, and engineering described herein are well known and commonly used in the art. In case of conflict, the present disclosure, including definitions, will control. Exemplary methods and materials are described below, although methods and materials similar or equivalent to those described herein can be used in practice or testing of the embodiments and aspects described herein.

As used herein, the term "effective amount" refers to an amount of a compound described herein that will elicit a biological response. In one aspect, the effective amount may refer to the amount of a volatile insect attractant sufficient to attract insects. In another aspect, the effective amount of an insecticide refers to an amount sufficient to kill insects on contact.

As used herein, the term "substantially" means to a great or significant extent, but not completely.

As used herein, all percentages (%) refer to mass (or weight, w/w) percent unless noted otherwise.

As used herein, the term "about" refers to any values, including both integers and fractional components that are within a variation of up to ±10% of the value modified by the term "about."

As used herein, the term "a," "an," "the" and similar terms used in the context of the disclosure (especially in the context of the claims) are to be construed to cover both the singular and plural unless otherwise indicated herein or clearly contradicted by the context. In addition, "," "an," or "the" means "one or more" unless otherwise specified.

As used herein, the terms such as "include," "including," "contain," "containing," "having," and the like mean "comprising."

As used herein, the term "or" can be conjunctive or disjunctive.

As used herein, the terms "attractant," "insect attractant" or "volatile insect attractant" refer to a volatile or fugitive chemical compound that attracts insects. In one embodiment the volatile insect attractant is a compound such as ammonia or a compound that releases or decomposes forming ammonia. In one aspect, the volatile insect attractant comprises one or more of ammonium carbonate, ammonium carbamate, ammonium bicarbonate, ammonium phosphate, ammonium chloride, ammonium nitrate, ammonium sulfate, ammonium sulfamate, ammonium sulfide, ammonium persulfate, ammonium perchlorate, ammonium hydrogen citrate, ammonium hydrogen phosphate, ammonium hydrogen sulfate, ammonium acetate, ammonium lactate, ammonium formate, ammonium oxalate, ammonium citrate, ammonium tartrate, ammonium hydroxide, or other ammonium salts. Other potential attractants comprise urea, uric acid, spermidine, putrescine, cadaverine, theramine, thermospermine, canavalmine, aminopentyl norspermine, N,N'-bis(aminopropyl)cadaverine, caldopentamine, homocaldopentamine, caldohexamine, agmatine, ornithine, taurine, creatine, skatole, butyric acid, isovaleric acid, ascorbic acid, trimethylamine, 3-alkyl-1-butanol, 3-methyl-1-butanol, acetone, butyric acid, lactic acid, dimethyldisulfide, 2-phenylethanol, spiroketal, inter alia. In one aspect, the volatile insect attractant comprises one or more of ammonium carbonate, ammonium carbamate, or ammonium bicarbonate, or a combination thereof.

The volatile insect attractant ammonium carbonate spontaneously decomposes into ammonium bicarbonate and ammonia at room temperature as shown:

$$(NH_4)_2CO_3(s) \rightarrow NH_3(g) + NH_4HCO_3(s).$$

Ammonium bicarbonate further decomposes to carbon dioxide, water, and another molecule of ammonia:

$$NH_4HCO_3(s) \rightarrow NH_3(g) + H_2O(g) + CO_2(g).$$

The volatile insect attractant ammonium carbamate decomposes to form carbon dioxide and ammonia as shown:

$$NH_4CO_2NH_2(s) \rightarrow 2NH_3(g) + CO_2(g).$$

Other ammonium salts also spontaneously decompose and release ammonia over time.

As used herein, the terms "receptacle" or "attractant receptacle" refer to the pouch, sleeve, or envelope that the volatile insect attractant is placed within and sealed. In one embodiment, the receptacle comprises a sealable sleeve comprising one or more of polyvinyl chloride, polyester, polyethylene, polypropylene, polyethylene terephthalate, polyether ether ketone, fluoropolymer, ethylene vinyl acetate, nylon, or aluminum. In one aspect, the receptacle comprises a sealable sleeve comprising polyvinyl chloride, polyethylene, or polyester. The receptacle typically contains one or more "orifices" or "punches" that permits the diffusion of ammonia produced by decomposition of the volatile insect attractant.

As used herein, the terms "orifice" or "punch size" refer to one or more openings in the receptacle through which ammonia is released. The orifice has a defined diameter. Without being bound by any theory, typically an orifice with a larger diameter releases ammonia at a greater rate than an orifice with a smaller diameter. Typical orifice diameters comprise about 1 mm to about 40 mm including all integers within the range. In some embodiments the orifice diameter is about 1 mm to about 10 mm, about 1 mm to about 5 mm, about 2 mm to about 4 mm, about 1.5 mm to about 2.5 mm, or about 1.5 mm to about 2 mm, including all integers within the specified ranges. Specific embodiments comprise orifice sizes or about: 1.6 mm (1⁄16 in); 3.2 mm (1⁄8 in); 6.35 mm (1⁄4 in); 9.5 mm (3⁄8 in); 25.4 mm (1 in); or 33.3 mm (15⁄16 in). In some embodiments the orifice is covered by a permeable membrane.

As used herein, the terms "membrane," "permeable membrane," or "permeable orifice" refer to a gas permeable film which cover the orifice of the volatile insect attractant receptacle. In one aspect, the membrane comprises a microporous film of polyethylene, polypropylene, polyethylene terephthalate, or polyester. In one aspect, the permeable membrane comprises a microporous film of polyethylene or polypropylene. In a specific embodiment, the permeable membrane comprises a polypropylene microporous film comprising about 70% polypropylene and about 30% calcium carbonate (e.g., Aptra UV8; JC Brighton LLC). In some embodiments, the permeable membrane is affixed to the surface of the volatile insect attractant receptacle using heat sealing (electronic welding), an adhesive, or combination thereof. In another embodiment, the permeable membrane is affixed to the surface of the volatile insect attractant receptacle using heat seal and an embossed ring seal.

As used herein, the term "ring seal" refers to a gasket or sealing means to affix the permeable membrane to the surface of the volatile insect attractant receptacle. The ring seal can comprise a heat seal or electronically welded seal. In one aspect, the permeable membrane and receptacle impermeable barrier material are affixed to each other by heat sealing the materials together. Without being bound by any theory, the use of a ring seal to affix the permeable membrane to the surface of the attractant receptacle decreases the release rate of ammonia and prolongs the useful life of the attractant system.

As used herein, the terms "quantity of volatile insect attractant" or "mass of volatile insect attractant" refers to the mass of the volatile insect attractant present in the "receptacle" or "attractant receptacle" at any given time. The initial quantity or mass of the volatile insect attractant is the amount sealed in the receptacle. Over time, this mass decreases as the volatile insect attractant releases ammonia, carbon dioxide (and water in the case of ammonium carbonate or bicarbonate).

As used herein the term "lure" refers to an attractant receptacle, having a permeable membrane and a volatile insect attractant sealed within the attractant receptacle. The lure can be deployed in an insecticide transfer envelope to form an attract and kill system.

As used herein, the terms "mass loss" or "weight loss" refer to the amount of volatile insect attractant that decomposes and releases volatile products. The mass loss is determined by measuring the initial mass of the volatile insect attractant and then the mass at another time. The difference is the mass of volatile insect attractant that decomposed into gaseous products such as ammonia, carbon dioxide, and water. The total mass loss encompasses the mass of all volatile components released. The mass of a specific decomposition component, such as ammonia, can be calculated based on the mole ratio of the volatile insect attractant and the respective decomposition products.

As used herein, the term "release rate" refers to the amount of volatile insect attractant that decomposes and releases volatile components over a period of time (i.e., the mass loss per time). The release rate is specified in terms of mass per time such as mg/day. The release rate is determined by measuring the initial mass of the volatile insect attractant and then the mass after specific periods of time. The release rate can be based on the decomposition of the volatile insect attractant to gaseous ammonia and carbon dioxide (and water in the case of ammonium carbonate or bicarbonate). In one aspect, the release rate encompasses the release of all decomposition products (e.g., ammonia, carbon dioxide, and water). In another aspect, the specific release rate of ammonia, for example, can be calculated based on the mole ratio of the volatile insect attractant and the respective decomposition products. In one aspect, the release rate of the attractant system described herein is about 1 mg to about 1000 mg per day, including all integers within the specified range. In another aspect, the release rate is about: 10 mg/day, 20 mg/day; 25 mg/day, 50 mg/day, 75 mg/day, 100 mg/day, 125 mg/day, 150 mg/day, 175 mg/day, 200 mg/day, 225 mg/day, 250 mg/day, 275 mg/day, 300 mg/day, 325 mg/day, 350 mg/day, 375 mg/day, 400 mg/day, 425 mg/day, 450 mg/day, 475 mg/day, 500 mg/day, 525 mg/day, 550 mg/day, 575 mg/day, 600 mg/day, 625 mg/day, 650 mg/day, 675 mg/day, 700 mg/day, 725 mg/day, 750 mg/day, 775 mg/day, 800 mg/day, 825 mg/day, 850 mg/day, 875 mg/day, 900 mg/day, 925 mg/day, 950 mg/day, 975 mg/day, or 1000 mg/day. In another aspect, the volatile insect attractant is released at a rate of about 50 mg to about 150 mg per day. In one aspect, the volatile insect attractant is released at a rate of about 100 mg per day. In another aspect, the release rate is about 5 mg to about 85 mg per day including all integers within the specified range. In another aspect, the release rate is about 5 mg to about 30 mg per day including all integers within the specified range. In another aspect, the release rate is about 5 mg to about 20 mg per day including all integers within the specified range. In another aspect, the release rate is about 5 mg to about 15 mg per day including all integers within the specified range. In one aspect, the release rate is 100 mg per day and is the total mass loss of the volatile insect attractant. In one aspect, the average release rate is from about 15 g/day to about 85 g/day. In another aspect, the average release rate is about 30 g/day. In another aspect, the average ammonia release rate is from about 1 mg/day to about 30 mg/day. In another aspect, the average ammonia release rate is about 12 mg/day.

As used herein, the terms "attractant lifetime" or "useful life of the attractant system" refer to the period of time where the attractant system is capable of releasing ammonia from the volatile insect attractant to effectively attract insects. As used herein, the phrase "quantity of the volatile insect attractant is released over a period of 1 day to over 1 year" refers to the attractant lifetime. In one embodiment described herein, the attractant lifetime is from about 1 day to over 1 year, including all integers within the specified range. In one aspect, the attractant lifetime is from about 1 day to about 540 days; about 1 day to about 480 days; about 15 days to about 360 days; about 15 days to about 300 days; about 15 days to about 270 days; about 30 days to about 540 days; about 30 days to about 480 days; about 30 days to about 360 days; about 30 days to about 300 days; about 30 days to about 270 days; about 30 days to 180 days; about 30 days to about 90 day; about 30 days to 60 days; about 45 days to about 540 days; about 45 days to about 480 days; about 45 days to about 360 days; about 45 days to about 300 days; about 45 days to about 270 days; about 45 days to 180 days; about 45 days to about 90 day; about 45 days to 60 days; about 60 days to about 540 days; about 60 days to about 450 days; about 60 days to about 360 days, about 60 days to about 300 days; about 60 days to about 270 days; about 60 days to about 180 days; about 60 days to about 120 days; about 60 days to about 90 days, about 90 days to about 540 days; about 90 days to about 450 days; about 90 days to about 360 days, about 90 days to about 300 days; about 90 days to about 270 days; about 90 days to about 180 days; about 90 days to about 120 days; about 180 days to about 540 days; about 180 days to about 450 days; about 180 days to about 360 days, about 180 days to about 300 days; about 180 days to about 270 days; or about 270 days to about 540 days; about 270 days to about 450 days; about 270 days to about 360 days, about 270 days to about 300 days; about 360 days to about 540 days; about 360 days to about 450 days, including all integers within the specified ranges. In another aspect, the attractant lifetime is about 1 week, 2 weeks, 3 weeks, 4 weeks, 1 month, 2 months, 3 months, 4 months, 5 months, 6 months, 7 months, 8 months, 9, months, 10 months, 11 months, 12 months, 13 months, 14 months, 15, months, 16 months, 17 months, or 18 months. In another aspect, the attractant lifetime is at least about 1 growing season.

In one aspect, the attractant lifetime varies depending on the initial attractant amount (mass), the type of membrane, the orifice diameter, whether a ring seal is used, and the temperature. Without being bound by any theory, the kinetics of relase depend on the type and amount of attractant, the orifice diameter, the membrane material, the presence of a ring seal, and the temperature of the environment. Generally, a large mass of attractant, a larger orifice, a highly permeable membrane, the lack of a ring seal, and higher temperatures increase the release rate. In one embodiment described herein, the release rate of the attractant does vary slightly by temperature but not significantly.

As used herein the term "insecticide transfer envelope" refers to an apparatus or device for enclosing a volatile insect attractant and one or more surfaces that can be coated with one or more insecticides. In one aspect, the insecticide transfer envelope comprises a sheet of vented plastic (polyvinyl chloride, polypropylene, or combination thereof) that is folded to create an envelope with at least one opening (at the top or at least one side) in which the volatile insect attractant and receptacle therefore can be inserted and enclosed. In another embodiment, the insecticide transfer envelope comprises an envelope, pouch or sealable sleeve comprising one or more of polyester, polyethylene, polypropylene, polyethylene terephthalate, polyether ether ketone, fluoropolymer, ethylene vinyl acetate, nylon, or aluminum. Typically, the insecticide transfer envelope comprises one or more vents or openings for the volatile insect attractant to be released. The insecticide transfer envelope may also contain a hanger for suspending the lure from a tree branch or string. In another embodiment, the insecticide transfer envelope and volatile insect attractant receptacle are combined as a single envelope, pouch, or sealable sleeve, comprising a permeable membrane for the release of the volatile insect attractant, and a hanger.

As used herein, the term "insecticide" refers to one or more chemical species that can kill insects. In one embodiment, the insecticide is a contact insecticide that kills the insect upon direct contact. As used herein "contact" or "contacting" refers to the insect being exposed to one or more insecticides by landing or crawling on a surface having one or more insecticides dispersed thereon. In one embodiment, the insecticide comprises one or more of pyrethroids, organochlorides, organophosphates, carbamates, neonicotinoids, ryanoids, spinosyns, or sulfoximines. In one aspect the insecticide comprises one or more pyrethroids. The insecticide may be dispersed on the surface of the insecticide transfer envelope. The insecticide can be immobilized on the surface by combining the insecticide with other agents such as ionic or non-ionic surfactants, dispersants, thickeners, sticking agents, or the like as known in the art. In one aspect, the insecticide is immobilized on the surface using polyvinyl acetate.

As used herein, the term "insect" refers to flying or crawling insects of the phylogenic Class Insecta, including wingless insects, Apterygota, and winged insects, Pterygota. In one embodiment, insect refers to insect pests that infest or inflict damage on crops or orchards or the products produced therefrom. In one embodiment, insect comprises one or more of the genera *Anastrepha, Bactrocera, Ceratitis, Dacus, Drosophila, Rhagoletis*, or *Vidalia*. In one aspect, insect comprises one or more of the species: South American fruit fly (*Anastrepha fraterculus*), Mexican fruit fly (*Anastrepha ludens*), Oriental fruit fly (*Bactrocera dorsalis*), Melon fly (*Bactrocera cucurbitae*), Olive fruit fly (*Bactrocera oleae*), Queensland fruit fly (*Bactrocera tryoni*), Peach fruit fly (*Bactrocera zonata*), Mediterranean fruit fly (*Ceratitis capitata*), common fruit fly, (*Drosophila melanogaster*), Spotted-wing *drosophila* (*Drosophila suzukii*), European cherry fruit fly (*Rhagoletis cerasi*), Walnut husk fly (*Rhagoletis* complete), or apple maggot (*Rhagoletis pomonella*), inter alia.

Described herein are systems and methods for attracting insects to a trap or surface containing insecticide. One embodiment described herein is an insect attractant releasing system comprising a quantity of a volatile insect attractant where the attractant is released at a defined rate and has a particular product lifetime under field conditions. In another embodiment, the attractant releasing system is integrated into an apparatus having insecticide immobilized on one or more surfaces where attracted insects can land and contact the insecticide, which subsequently kills the insects. In one embodiment, the attractant releasing system and attract and kill system are combined in a single receptacle/envelope unit.

Another embodiment described herein is a system for attracting insects, the system comprising: an attractant receptacle enclosing a quantity of a volatile insect attractant, the receptacle having one or more permeable orifices of a defined diameter, where the receptacle passively releases the volatile insect attractant through the one or more permeable orifices; and the volatile insect attractant lasts for a period of time of about 1 day to about 1 year. In one aspect, the one or more permeable orifices comprises an orifice covered by a permeable membrane. In another aspect, the receptacle passively releases the volatile insect attractant through the one or more permeable orifices at a rate of about 1 mg to about 400 mg per day.

Another embodiment described herein is a system for attracting insects. See FIG. 1A. In one embodiment the insect attractant system 10 comprises a sealed 30 attractant receptacle 20 enclosing a quantity of a volatile insect attractant 80, the receptacle comprising one or more orifices having a defined diameter 50, the one or more orifices being covered by a permeable membrane 60 affixed to the surface of the receptacle using a heat seal and optionally a ring seal 70. The receptacle passively releases the volatile insect attractant 40 through the permeable membrane 60 covering the one or more orifices 50; and the quantity of the volatile insect attractant is released over a period of 1 day to over 1 year. In one embodiment, the receptacle passively releases the volatile insect attractant through the one or more permeable orifices at a rate of about 1 mg to about 800 mg per day. In one aspect, the receptacle passively releases the volatile insect attractant through the one or more permeable orifices at a rate of about 30 mg per day.

Figure 1B:
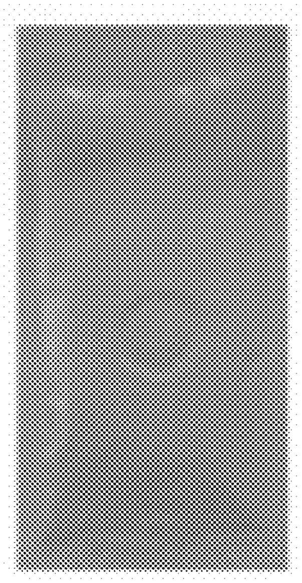

An exemplary embodiment of the attractant system is shown in FIG. 1B. In this example, the receptacle is a sealed sleeve comprising polyethylene or polyester. The volatile insect attractant comprises about 16 g of ammonium carbonate or ammonium carbamate, or a combination thereof. The attractant system has an orifice diameter of 3.2 mm (1/16 in) which is covered by a permeable membrane comprising a polypropylene microporous film consisting of about 70% polypropylene and about 30% calcium carbonate (e.g., Aptra UV8; JC Brighton LLC). The permeable membrane is affixed to the attractant receptacle with a ring seal. This particular embodiment releases the volatile attractants (ammonia, carbon dioxide, water) at a rate of about 100 mg/day. The attractant lifetime is about 30 days to 480 days in the field.

Another embodiment is a system for attracting insects, the system comprising an attractant receptacle enclosing a quantity of a volatile insect attractant, the receptacle comprising one or more orifices having a defined diameter, the one or more orifices being covered by a permeable membrane; where the receptacle passively releases the volatile insect attractant through the permeable membrane covering the one or more orifices; and the quantity of the volatile insect attractant is released over a period of 1 day to over 1 year.

In one embodiment, the volatile insect attractant is released over a period of about: 15 days, 1 month, 2 months, 3 months 4 months, 5 months, 6 months, 7 months, 8 months, 9 months, 10 months, 11 months, 12 months, 13 months, 14 months, 15, months, 16 months, 17 months, or 18 months. In another aspect, the volatile insect attractant is released over a period of about 60 days to about 540 days; about 60 days to about 450 days; about 60 days to about 360 days, about 60 days to about 300 days; about 60 days to about 270 days; about 60 days to about 180 days; about 60 days to about 120 days; or about 60 days to about 90 days.

In another embodiment, the volatile insect attractant is released at a rate of about 1 mg to about 800 mg per day. In one aspect, the volatile insect attractant is released at a rate of about: 10 mg/day, 25 mg/day, 50 mg/day, 75 mg/day, 100 mg/day, 125 mg/day, 150 mg/day, 175 mg/day, 200 mg/day, 225 mg/day, 250 mg/day, 275 mg/day, 300 mg/day, 325 mg/day, 350 mg/day, 375 mg/day, 400 mg/day, 425 mg/day, 450 mg/day, 475 mg/day, 500 mg/day, 525 mg/day, 550 mg/day, 575 mg/day, 600 mg/day, 625 mg/day, 650 mg/day, 675 mg/day, 700 mg/day, 725 mg/day, 750 mg/day, 775 mg/day, 800 mg/day, 825 mg/day, 850 mg/day, 875 mg/day, 900 mg/day, 925 mg/day, 950 mg/day, 975 mg/day, or 1000 mg/day. In another aspect, the volatile insect attractant is released at a rate of about 10 mg to about 150 mg per day. In another aspect, the volatile insect attractant is released at a rate of about 100 mg per day.

In one embodiment, the volatile insect attractant comprises one or more of ammonium carbonate, ammonium carbamate, ammonium bicarbonate, ammonium phosphate, ammonium chloride, ammonium nitrate, ammonium sulfate, ammonium sulfamate, ammonium sulfide, ammonium persulfate, ammonium perchlorate, ammonium hydrogen citrate, ammonium hydrogen phosphate, ammonium hydrogen sulfate, ammonium acetate, ammonium lactate, ammonium formate, ammonium oxalate, ammonium citrate, ammonium tartrate, ammonium hydroxide, or other ammonium salts. In one aspect, the volatile insect attractant comprises one or more of ammonium carbonate, ammonium carbamate, or ammonium bicarbonate. In one embodiment, the quantity of the volatile insect attractant comprises about 5 g to about 100 g, including all integers within the specified range. In another aspect, the quantity of the volatile insect attractant comprises about 5 g to about 25 g. In another aspect, the quantity of the volatile insect attractant comprises about 10 g to about 20 g.

In another embodiment the permeable membrane comprises a microporous film of polyethylene, polypropylene, polyethylene terephthalate, or polyester. In one aspect, the permeable membrane comprises a microporous film of polyethylene or polypropylene. In one aspect, the defined diameter of the orifice is about 1 mm to about 40 mm. In another aspect, the defined diameter of the orifice is about 1 mm to about 5 mm. In another aspect, the defined diameter of the orifice is about 2 mm to about 4 mm. In another embodiment, the permeable membrane is affixed it to the attractant receptacle with a heat seal and/or ring seal.

In another embodiment, the attractant receptacle comprises a sealable sleeve comprising one or more of polyester, polyethylene, polypropylene, polyethylene terephthalate, polyether ether ketone, fluoropolymer, ethylene vinyl acetate, nylon, or aluminum. In one aspect, the attractant receptacle comprises a sealable sleeve comprising polyethylene or polyester.

Another embodiment is an insect attractant system comprising an attractant receptacle enclosing a quantity of a volatile insect attractant, the receptacle comprising one or more orifices having a defined diameter, the one or more orifices being covered by a permeable membrane; where the receptacle passively releases the volatile insect attractant through the permeable membrane covering the one or more orifices. In one aspect, the attractant receptacle comprises a sealable sleeve comprising polyethylene or polyester; the receptacle comprises one or more orifices having a defined diameter of about 2 mm to about 4 mm; the one or more orifices are covered by a permeable membrane comprising a microporous film of polyethylene or polypropylene; the volatile insect attractant comprises about 5 g to about 25 g of one or more of ammonium carbonate, ammonium carbamate, or ammonium bicarbonate; the volatile insect attractant is released over a period of about 30 days to about 480 days; and the volatile insect attractant is released at a rate of about 1 mg to about 800 mg per day.

Another embodiment is a method for attracting insects by releasing a quantity of volatile insect attractant from a receptable comprising one or more membranous orifices having a defined diameter; wherein the quantity of the volatile insect attractant is released over a period of 1 day to over 1 year. In another embodiment the volatile insect attractant is released at a rate of about 1 mg/day to about 800 mg/day.

A means for attracting insects comprising a means for enclosing and passively releasing a volatile insect attractant as described herein; wherein the volatile insect attractant is released over a period of 1 day to over 1 year. In another embodiment the volatile insect attractant is released at a rate of about 1 mg/day to about 800 mg/day. In another embodiment the volatile insect attractant is released at a rate of about 10 mg/day to about 400 mg/day.

Another embodiment is the use of an insect attractant system comprising deploying an insect attractant system; whereby upon release of a volatile insect attractant, insects are attracted to the vicinity of the insect attractant system. In one aspect, insects are attracted to a surface of a device for enclosing and passively releasing a volatile insect attractant. In another embodiment, upon deployment, the volatile insect attractant is released over a period of 1 day to over 1 year. In another embodiment the volatile insect attractant is released at a rate of about 10 mg/day to about 800 mg/day.

Another embodiment is a method for manufacturing an insect attractant system or an attract and kill system comprising inserting a quantity of a volatile insect attractant into a receptacle envelope and sealing the receptable envelop, wherein the attractant receptacle envelop comprises one or more orifices of a defined diameter, the one or more orifices being covered by a permeable membrane. In one aspect, the permeable membrane is covered by a seal that is removed by the user immediately prior to use. This prevents the volatile insect attractant from being released after manufacturing and during shipment and storage. In another aspect, the insect attractant system is hermetically packaged in an airtight and light-proof package such as plastic or mylar which prevents exposure to air and light. In another aspect, the insect attractant systems are stored in a temperature-controlled environment to prevent premature decomposition of the volatile insect attractant.

Another embodiment is an insect attractant system or an attract and kill system manufactured by the methods described herein.

Another embodiment a kit for attracting insects comprising an attractant receptable enclosing a quantity of a volatile insect attractant, the attractant receptacle comprising one or more orifices of a defined diameter, the one or more orifices being covered by a permeable membrane; the permeable membrane being covered by a removable seal; a sealed package for enclosing the attractant receptacle; optionally, instructions or directions for use.

Figure 2A:
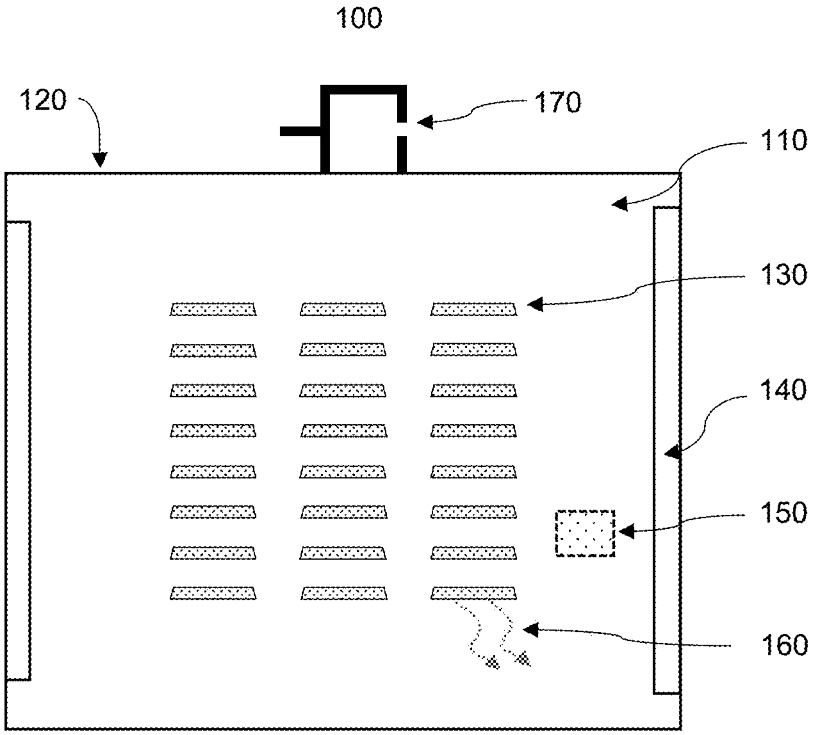
FIG. 2A-B show an exemplary insecticide transfer envelope.
Figure 2B:
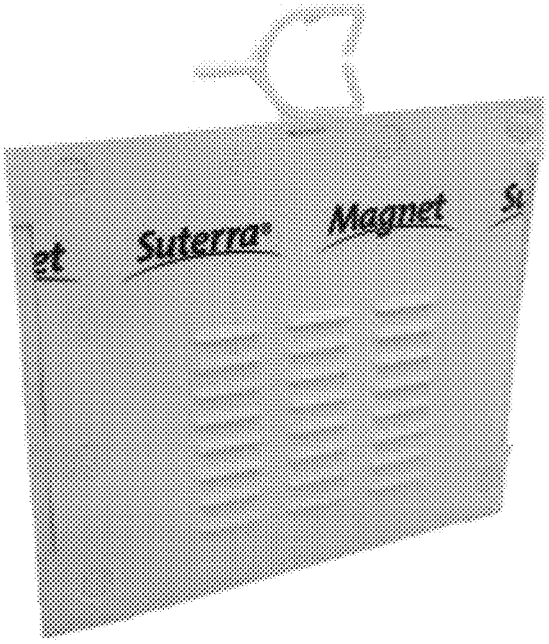
Figure 3A:
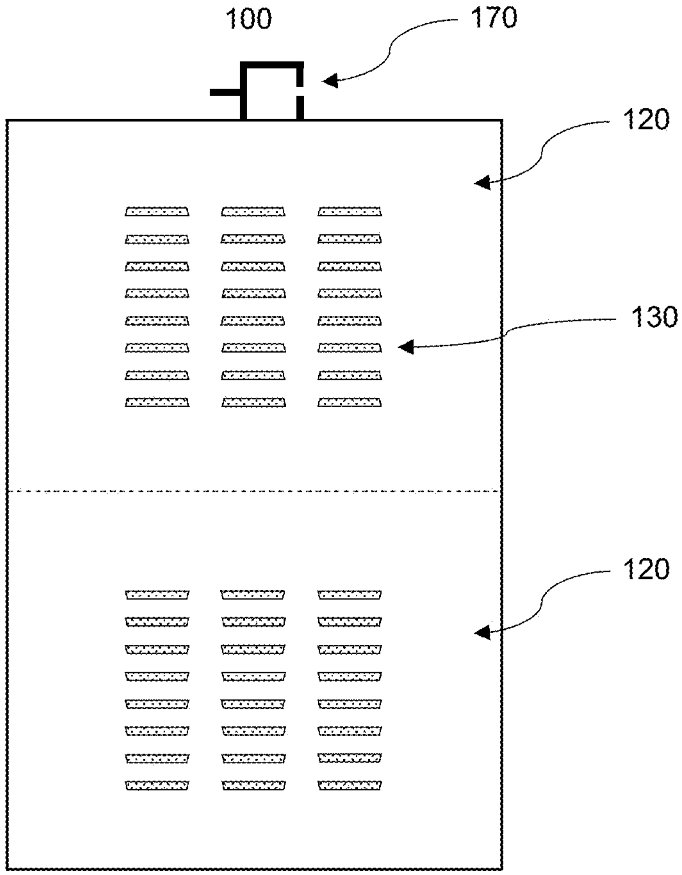
FIG. 3A-B show an exemplary insecticide transfer envelope.
Figure 3B:
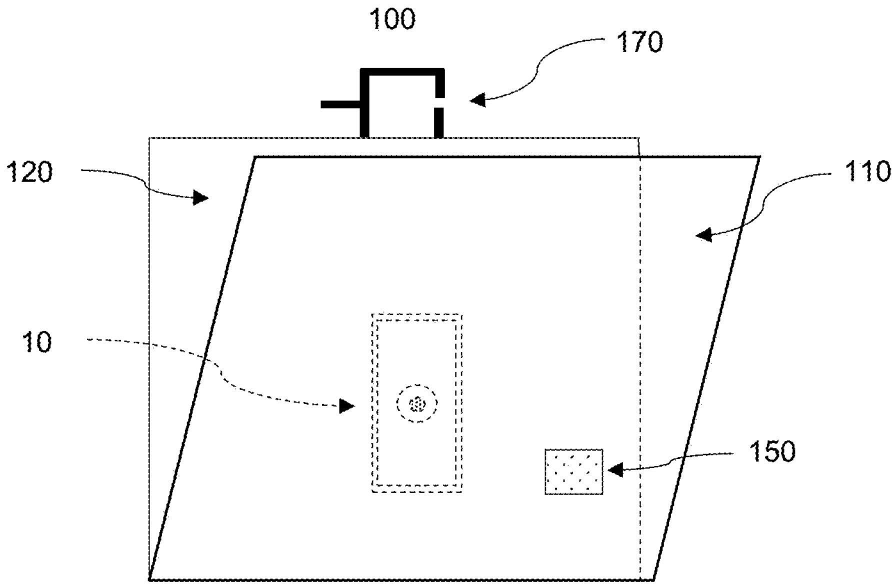
Figure 4A:
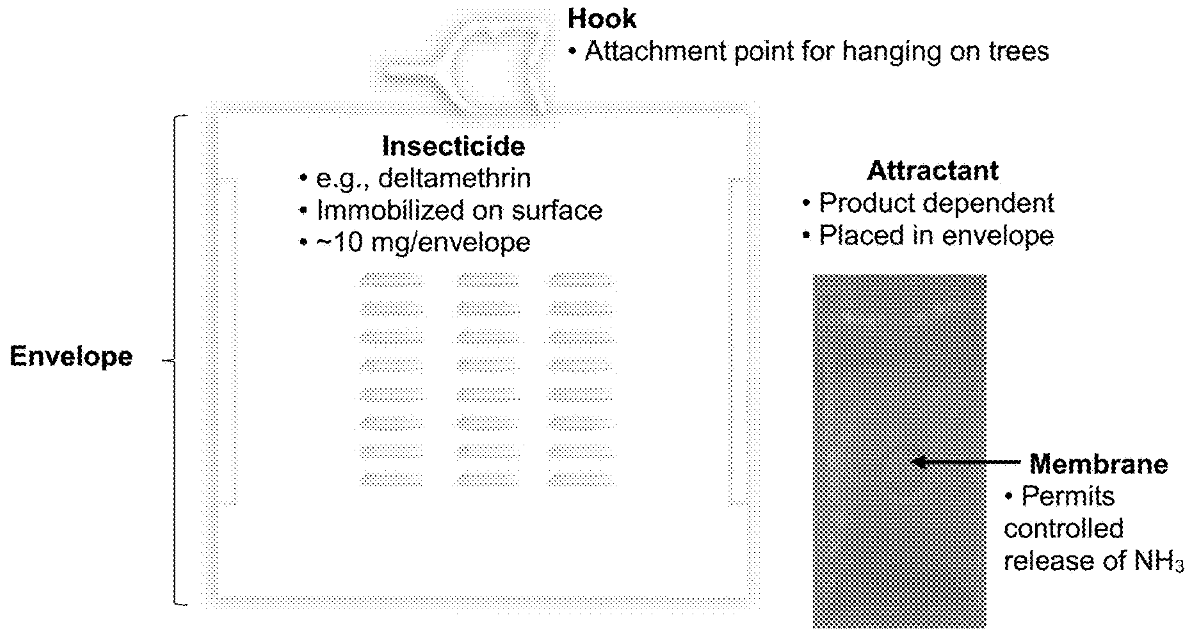
FIG. 4A-B show an exemplary attract and kill system.
Figure 4B:

Another embodiment described herein is a system for attracting and killing insects (refer to FIG. 2-4) comprising an insecticide transfer envelope 100 comprising an exterior 110 and an interior 120, with an insecticide uniformly immobilized on the exterior surfaces 150. In one embodiment the insecticide transfer envelope 100 comprises a flat sheet of plastic, metal, or other suitable material, having one or a plurality of vents or openings 130 that permit the release 160 of the volatile insect attractant 80, and a hanger 170. The sheet can be folded to create an envelope-like configuration having an exterior 110 and an interior 120. The exterior surfaces are uniformly coated or sprayed with one or more insecticides 150 and any required sticking agents (such as a non-ionic surfactant) that immobilizes the insecticide on the exterior surface 110 and prevents it from being removed by rain, wind, or other environmental factors. The interior 120 is configured to enclose an insect attractant system 10 (refer to FIG. 1A) comprising a receptacle 20 enclosing a quantity of a volatile insect attractant 80, the attractant receptacle comprising one or more orifices of a defined diameter 50, the one or more orifices being covered by a permeable membrane 60 affixed to the surface of the receptacle using a heat seal and optionally a ring seal 70. The receptacle passively releases the volatile insect attractant 40, 160, through the permeable membrane 60 covering the one or more orifices 50; and the quantity of the volatile insect attractant is released over a period of 1 day to over 1 year.

In one embodiment, the insecticide transfer envelope 110 is configured so that the fold is at the bottom, forming an envelope. In one aspect, the lateral sides are sealed by clamps 140 or other means (such as electronic welding) to prevent the insect attractant system 10 from falling out of the sides of the envelope. Alternative designs are possible, where the envelope is rotated 90° so that the folded portion is positioned on one of the sides. A sealing means such as a clamp or electronic welding would be required to retain the insect attractant system 10 in the envelope. In another design, the envelope is formed using two separate sheets that are affixed on two or three sides (e.g., the bottom and one or both sides) to retain the insect attractant system 10 within the envelope.

The insecticide transfer envelope 110 is configured to have at least one, and preferably a plurality of vents 130 to permit the diffusion of the volatile insect attractant 160 (or 40). The vents can comprise louvered vents, slits, punchouts, or any other suitable means for permitting the volatile insect attractant 160 (or 40) to diffuse from the interior to the exterior and into the environment, thereby attracting insects to the insecticide transfer envelope.

When an insect lands or crawls on the exterior of the insecticide transfer envelope 110, the insect contacts the insecticide 150 uniformly immobilized on the exterior surface of the insecticide transfer envelope 110. In one aspect, the insecticide 150 immobilized uniformly on the surfaces of both sides of the transfer envelope 110 (covering most of the area of both surfaces). The insecticide 150 is transferred to the insect by contact and kills the insect within a short period of time. As described herein, the insecticide can comprise one or more insecticides that are sprayed or coated on the exterior surface of the insecticide transfer envelope 110. The insecticide 150 may be diluted or combined with one or more agents that immobilize the insecticide and prevent it from being washed off by rain or other environmental factors. In one aspect, the insecticide is immobilized to the surface with polyvinyl acetate.

Another embodiment is a system for attracting and killing insects, the system comprising an insecticide transfer envelope comprising exterior and interior surfaces, with an insecticide immobilized on the exterior surface, and enclosing within the interior an attractant receptacle enclosing a quantity of a volatile insect attractant, the attractant receptacle comprising one or more orifices of a defined diameter, the one or more orifices being covered by a permeable membrane; where the receptacle passively releases the volatile insect attractant through the permeable membrane covering the one or more orifices; and the volatile insect attractant is released over a period of 1 day to over 1 year. In one aspect, the volatile insect attractant is released at a rate of about 10 mg to about 800 mg per day. In another aspect, the insecticide transfer envelope comprises a folded, two-sided surface, with at least one opening, at least one vent, and having a hook affixed to at least one surface edge. In another aspect, the insecticide comprises one or more of pyrethroids, organochlorides, organophosphates, carbamates, neonicotinoids, ryanoids, spinosyns, or sulfoximines. In one aspect, the insecticide comprises one or more pyrethroids. In another aspect, about 5 mg to about 20 mg of insecticide is immobilized on the surface of the insecticide transfer envelope. In another embodiment, the system for attracting and killing insects comprises an attractant receptacle comprising a sealable sleeve comprising polyethylene or polyester; the receptacle comprises one or more orifices having a defined diameter of about 2 mm to about 4 mm; the one or more orifices are covered by a permeable membrane comprising a microporous film of polyethylene or polypropylene; the volatile insect attractant comprises about 5 g to about 25 g of one or more of ammonium carbonate, ammonium carbamate, or ammonium bicarbonate; the insecticide comprises one or more pyrethroids; about 5 mg to about 20 mg of insecticide is immobilized on the surface of the insecticide transfer envelope; the volatile insect attractant is released over a period of about 30 days to about 480 days; and the volatile insect attractant is released at a rate of about 10 mg to about 800 mg per day. In one embodiment, the volatile insect attractant is released a rate of about 10 mg to about 400 mg per day.

In another embodiment, the insects comprise one or more of the genera *Anastrepha, Bactrocera, Ceratitis, Dacus, Drosophila, Rhagoletis*, or *Vidalia*. In one aspect, the insects comprise one or more of South American fruit fly (*Anastrepha fraterculus*), Mexican fruit fly (*Anastrepha ludens*), Oriental fruit fly (*Bactrocera dorsalis*), Melon fly (*Bactrocera cucurbitae*), Olive fruit fly (*Bactrocera oleae*), Queensland fruit fly (*Bactrocera tryoni*), Peach fruit fly (*Bactro-*

*cera zonata*), Mediterranean fruit fly (*Ceratitis capitata*), common fruit fly, (*Drosophila melanogaster*), Spotted-wing *drosophila* (*Drosophila suzukii*), European cherry fruit fly (*Rhagoletis cerasi*), Walnut husk fly (*Rhagoletis* complete), or apple maggot (*Rhagoletis pomonella*).

Figure 5A:
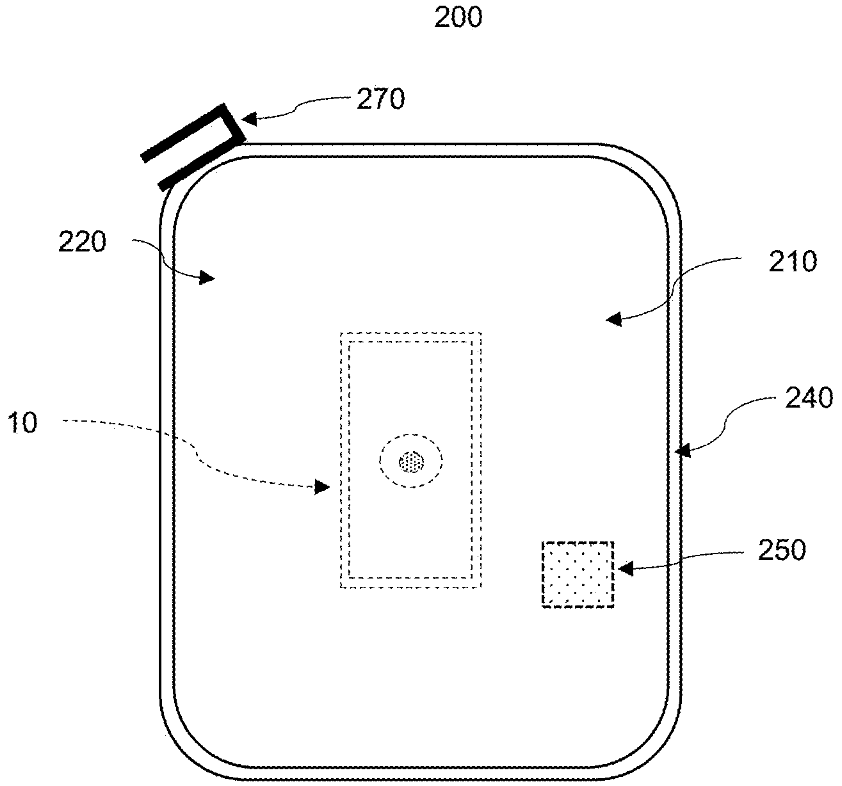
FIG. 5A-B show an alternative exemplary attract and kill system.
Figure 5B:
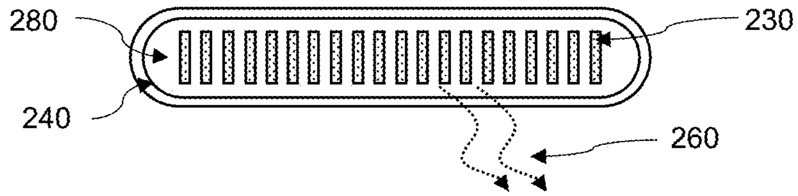

Another embodiment is a system for attracting and killing insects (refer to FIG. 5) comprising an insecticide transfer envelope 200 comprising exterior surfaces 210 and interior surfaces 220, with an insecticide immobilized uniformly on the area of the exterior surfaces 250 and a hanger 270. The insecticide transfer envelope 200 comprises a pouch or envelope being sealed on all sides 240. In one embodiment the insecticide transfer envelope 200 comprises an envelope of plastic or other suitable material, having one or a plurality of vents or openings 230 on the bottom surface 280 that permit the release 260 of the volatile insect attractant 80. The exterior 210 is uniformly coated or sprayed with one or more insecticides 250 and any required sticking agents (such as a non-ionic surfactant) that immobilizes the insecticide on the exterior surface 210 and prevents it from being removed by rain, wind, or other environmental factors. The interior 220 is configured to enclose an insect attractant system 10 (refer to FIG. 1A) comprising a receptacle 20 enclosing a quantity of a volatile insect attractant 80, the attractant receptacle comprising one or more orifices of a defined diameter 50, the one or more orifices being covered by a permeable membrane 60 affixed to the surface of the receptacle using a heat seal and optionally a ring seal 70. The receptacle passively releases the volatile insect attractant 40, 260, through the permeable membrane 60 covering the one or more orifices 50; and the quantity of the volatile insect attractant is released over a period of 1 day to over 1 year. In one aspect, the volatile insect is released at a rate of about 10 mg to about 800 mg per day.

Another embodiment is a system for attracting and killing insects, the system comprising an insecticide transfer envelope comprising exterior and interior surfaces, with an insecticide immobilized uniformly on the exterior surfaces, and enclosing within the interior an attractant receptacle enclosing a quantity of a volatile insect attractant, the attractant receptacle comprising one or more orifices of a defined diameter, the one or more orifices being covered by a permeable membrane; where the receptacle passively releases the volatile insect attractant through the permeable membrane covering the one or more orifices and through one or more vents positioned on the insecticide transfer envelope; and the volatile insect attractant is released over a period of 1 day to over 1 year. In one aspect, the volatile insect is released at a rate of about 10 mg to about 800 mg per day.

Figure 6:
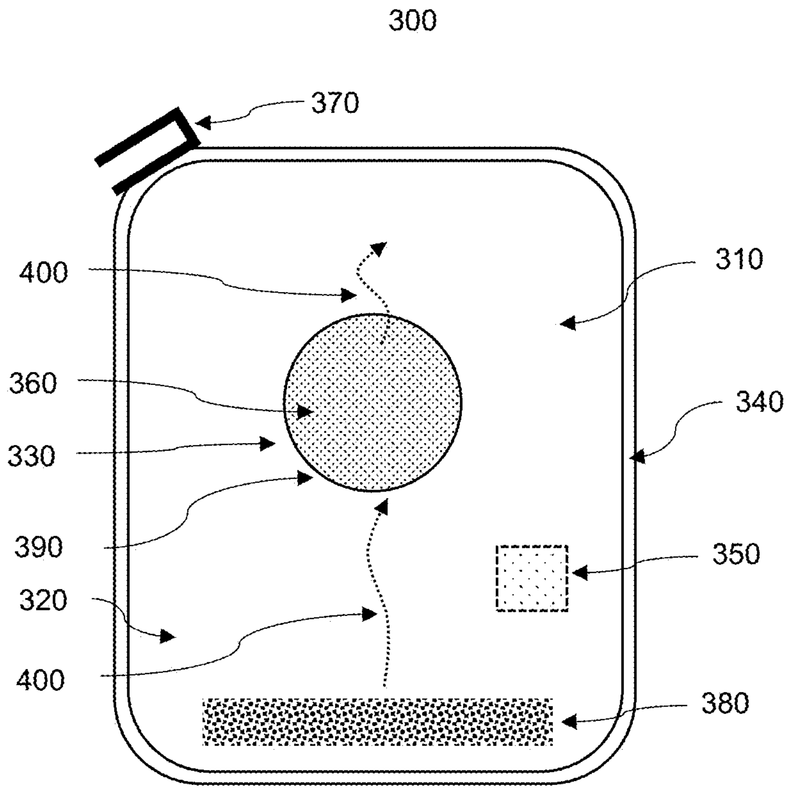
FIG. 6 shows an alternative exemplary embodiment of an attract and kill system where the insecticide transfer envelope and attractant receptacle are combined as a single unit. This embodiment includes an exemplary insecticide transfer envelope containing a volatile insect attractant, an exemplary insecticide disposed on the surface of the insecticide transfer envelope, and a hook for deploying the attract and kill system in the field.
Figure 7:
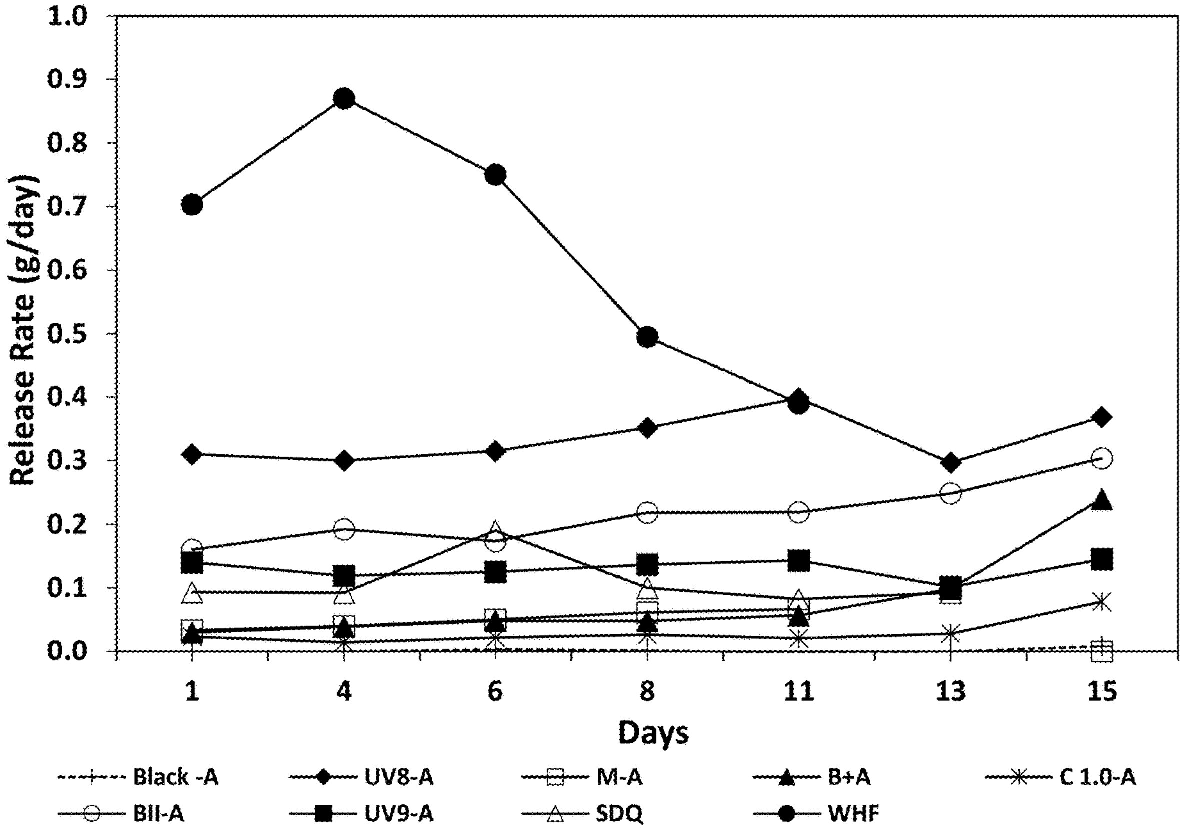
FIG. 7 shows the release rates of ammonium carbonate with various membrane materials having 3.2 mm (⅛ in) orifice size (Type-A). Data are shown in Table 3.
Figure 8:
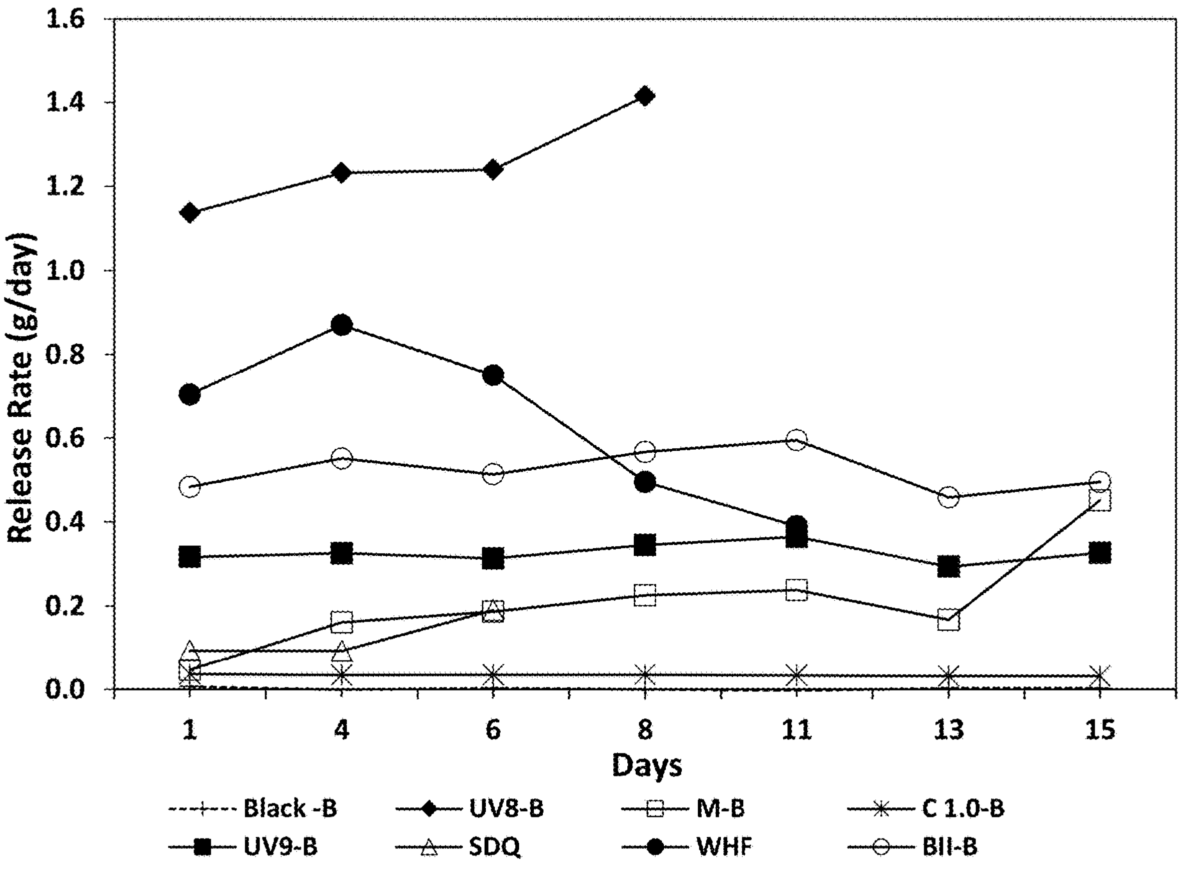
FIG. 8 shows the release rates of ammonium carbonate with various membrane materials having 9.5 mm (⅜ in) orifice size (Type-B). Data are shown in Table 3.
Figure 9:
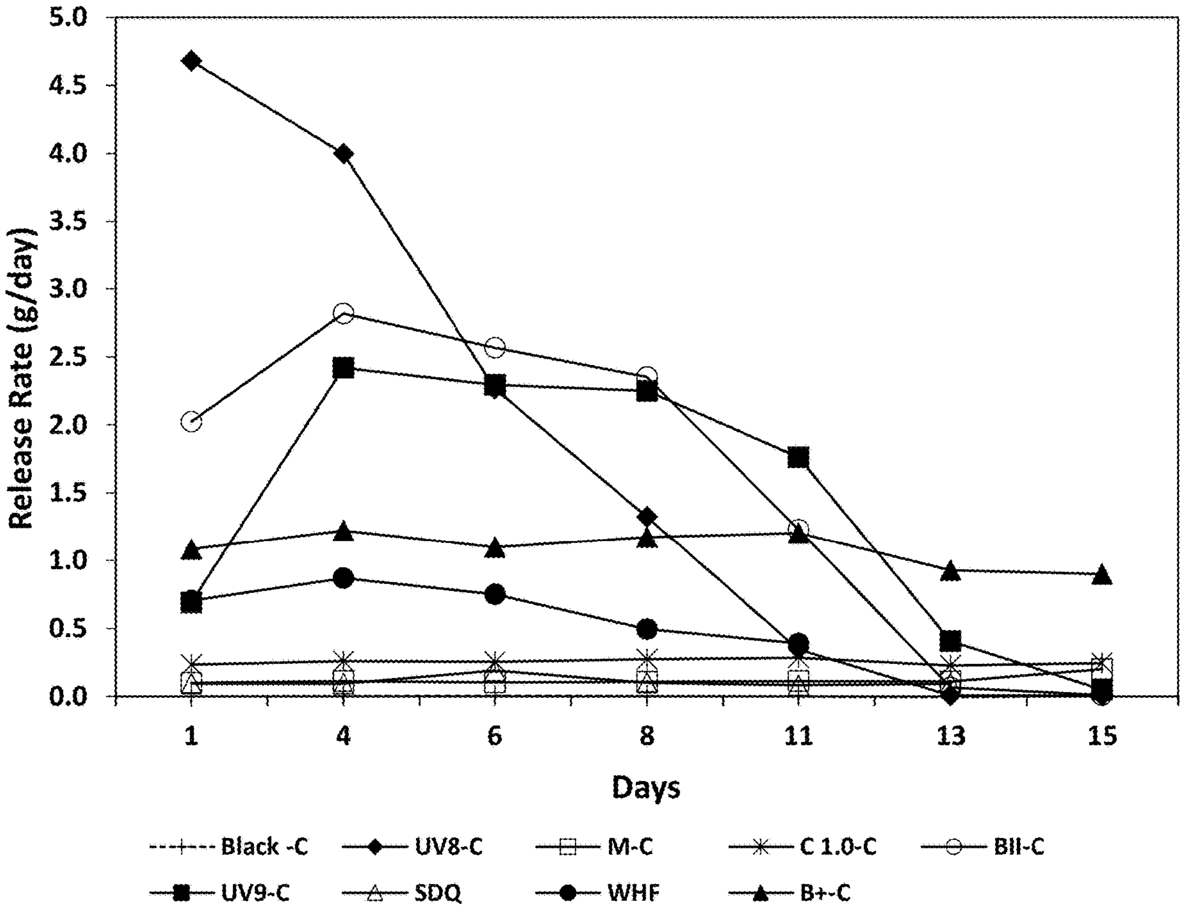
FIG. 9 shows the release rates of ammonium carbonate with various membrane materials having 33.3 mm (1 5/16 in) orifice size (Type-C). Data are shown in Table 3.
Figure 10:
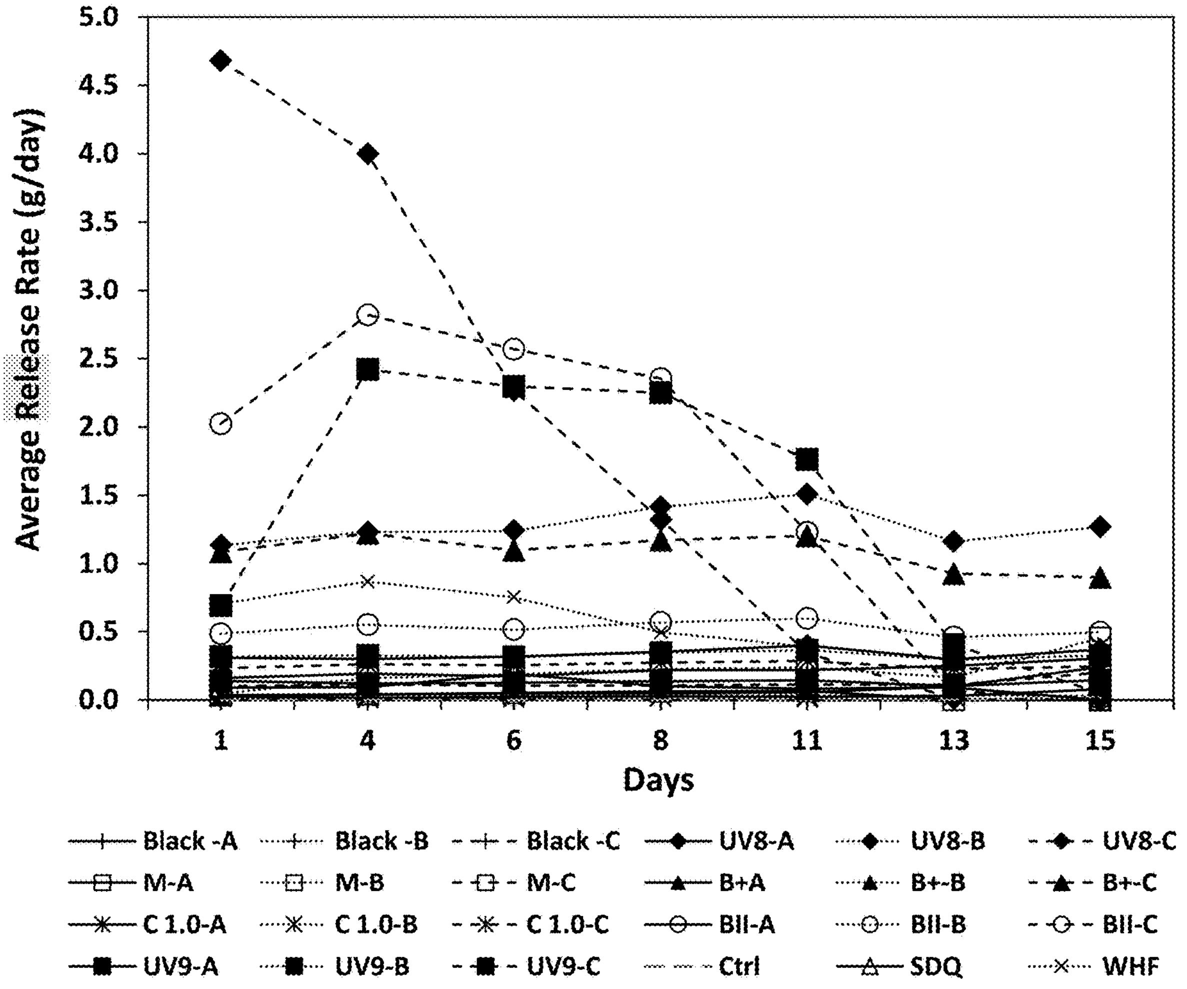
FIG. 10 shows the release rates of ammonium carbonate with various membrane materials and various orifice sizes (Type-A: 3.2 mm (⅛ in); Type-B: 9.5 mm (⅜ in); Type-C: 33.3 mm (1 5/16 in)). Data are shown in Table 3.

Another embodiment is a system for attracting and killing insects (refer to FIG. 6) where the insecticide transfer envelope 300 and the volatile insect attractant receptacle are combined as a single envelope/receptacle unit. In this embodiment, the system comprises an insecticide transfer envelope 300 comprising an exterior 310 and an interior 320, with an insecticide immobilized on the exterior surface 350 and a hanger 370. The insecticide transfer envelope 300 comprises a pouch or envelope being sealed on all sides 340. In one embodiment the insecticide transfer envelope 300 comprises an impermeable envelope of plastic or other suitable material. The insecticide transfer envelope 300 has an orifice of a defined diameter 330 that is covered with a permeable membrane 360 affixed to the surface of the envelope using a heat seal and optionally a ring seal 390. The exterior 310 is coated or sprayed with one or more insecticides 350 and any required sticking agents (such as a non-ionic surfactant) that immobilizes the insecticide on the exterior surface 310 and prevents it from being removed by rain, wind, or other environmental factors. The interior 320 is configured to enclose a quantity of a volatile insect attractant 380. The insecticide transfer envelope passively releases 400 the volatile insect attractant 380 through the permeable membrane 360 covering the one or more orifices 330; and the quantity of the volatile insect attractant is released over a period of 1 day to over 1 year. In one aspect, the volatile insect is released at a rate of about 10 mg to about 800 mg per day.

Another embodiment is a system for attracting and killing insects, the system comprising an insecticide transfer envelope and volatile insect attractant receptacle comprising exterior and interior surfaces, with an insecticide immobilized on the exterior surface, and enclosing within the interior a quantity of a volatile insect attractant, the insecticide transfer envelope comprising one or more orifices of a defined diameter, the one or more orifices being covered by a permeable membrane; where the insecticide transfer envelope passively releases the volatile insect attractant through the permeable membrane covering the one or more orifices; and the volatile insect attractant is released over a period of 1 day to over 1 year. In one aspect, the volatile insect is released at a rate of about 10 mg to about 800 mg per day.

Another embodiment is a method for attracting and killing insects, the method comprising attracting insects to an insecticide transfer surface having one or more insecticides dispersed thereon by passively releasing a volatile insect attractant from an attractant receptable enclosing a quantity of a volatile insect attractant, the attractant receptacle comprising one or more orifices of a defined diameter, the one or more orifices being covered by a permeable membrane; wherein the volatile insect attractant is released over a period of 1 day to over 1 year; whereby when an insect contacts the insecticide transfer surface, insecticide is transferred to the insect and effectuates the killing of the insect. In one embodiment, the volatile insect attractant is released a rate of about 10 mg to about 800 mg per day.

Another embodiment means for attracting and killing insects comprising attracting insects to a surface having one or more insecticides dispersed thereon by a means for enclosing and passively releasing a volatile insect attractant, wherein the volatile insect attractant is released over a period of 1 day to over 1 year; whereby when an attracted insect contacts the surface, insecticide is transferred thereto and effectuates the killing of the insect. In one embodiment, the volatile insect attractant is released at a rate of about 10 mg to about 800 mg per day.

Another embodiment is the use of an insect attractant and killing system comprising attracting insects to a surface having one or more insecticides dispersed thereon by a means for enclosing and passively releasing a volatile insect attractant, wherein the volatile insect attractant is released over a period of 1 day to over 1 year; whereby when an attracted insect contacts the surface, insecticide is transferred thereto and effectuates the killing of the insect. In one aspect, the volatile insect attractant is released at a rate of about 10 mg to about 800 mg per day.

Another embodiment is a kit for attracting and killing insects comprising an insecticide transfer envelope comprising exterior and interior surfaces, with an insecticide disposed on the exterior surface; an attractant receptable enclosing a quantity of a volatile insect attractant, the attractant receptacle comprising one or more orifices of a defined diameter, the one or more orifices being covered by a permeable membrane; the permeable membrane being covered by a removable seal; a sealed package for enclosing the attractant receptacle; optionally, instructions or directions for use. The kit may also contain gloves for the end-user to deploy the device without contacting the insecticide.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All the various embodiments, aspects, and options disclosed herein can be combined in any variations or iterations. The scope of the compositions, formulations, methods, and processes described herein include all actual or potential combinations of embodiments, aspects, options, examples, and preferences herein described. The compositions, formulations, or methods described herein may omit any component or step, substitute any component or step disclosed herein, or include any component or step disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the specification discloses and describes merely exemplary embodiments. All patents and publications cited herein are incorporated by reference herein for the specific teachings thereof.

EXAMPLES

Example 1

All prototype lure devices were constructed using the material indicated in Tables 1-5 for the membrane and Scotchpak™ (3M) polyester laminate films for the impermeable barrier material for the volatile insect attractant receptacle. Each device measured approximately 11.5 cm×11.5 cm and used ammonium carbonate (25 g) as the volatile insect attractant. The orifice size and permeable membrane material were varied as shown in Table 1. Prior to being deployed, the lure devices were weighed on an analytical balance (Sartorius, Universal; resolution of 0.01 g). Prototype lures were attached to a cord that ran the length of ventilated laboratory fume hood, with 5-8 cm (2-3 in) separating each lure. The lures were incubated at ambient temperature (18-20° C.). Every 2-3 days, the devices were removed from the cord and weighed on the same balance. Lure weight was recorded and the weight loss (g/day) was calculated. In addition to prototype lures, two controls were included in the study consisting of a current Suterra product (WHF lure) and a competitor product (Comp. Prod. 1).

Table 1 shows the membranes tested and the orifice sizes tested. Tables 2-3 show release rates of the volatile attractant based on orifice size (Table 2) or based on membrane type (Table 3). Tables 4-5 show mass loss of the volatile attractant based on orifice size (Table 4) or based on membrane type (Table 5).

TABLE 1

Test Membrane Materials and Orifice Sizes

| Prototype | Orifice size, mm (inches) | Membrane Material |
|---|---|---|
| Negative Control | 0 | None |
| Black-A | 3.2 (1/8) | Low-density polyethylene film (Black) |
| Black-B | 9.5 (3/8) | Low-density polyethylene film (Black) |
| Black-C | 33.3 (1 5/16) | Low-density polyethylene film (Black) |
| UV8-A | 3.2 (1/8) | Polypropylene/calcium carbonate film (UV8) |
| UV8-B | 9.5 (3/8) | Polypropylene/calcium carbonate film (UV8) |
| UV8-C | 33.3 (1 5/16) | Polypropylene/calcium carbonate film (UV8) |
| M-A | 3.2 (1/8) | Breathable industrial monolithic film (M-41150) |
| M-B | 9.5 (3/8) | Breathable industrial monolithic film (M-41151) |
| M-C | 33.3 (1 5/16) | Breathable industrial monolithic film (M-41152) |
| B+-A | 3.2 (1/8) | Breathable industrial monolithic film (B+ 74821/2) |
| B+-B | 9.5 (3/8) | Breathable industrial monolithic film (B+ 74821/2) |
| B+-C | 33.3 (1 5/16) | Breathable industrial monolithic film (B+ 74821/2) |
| C 1.0-A | 3.2 (1/8) | Breathable industrial monolithic film (C 1.0-41001) |
| C 1.0-B | 9.5 (3/8) | Breathable industrial monolithic film (C 1.0-41002) |
| C 1.0-C | 33.3 (1 5/16) | Breathable industrial monolithic film (C 1.0-41003) |
| BII-A | 3.2 (1/8) | Breathable industrial monolithic film (BII plus-09301417) |
| BII-B | 9.5 (3/8) | Breathable industrial monolithic film (BII plus-09301418) |
| BII-C | 33.3 (1 5/16) | Breathable industrial monolithic film (BII plus-09301419) |
| UV9-A | 3.2 (1/8) | Breathable industrial monolithic film (UV9-08311503) |
| UV9-B | 9.5 (3/8) | Breathable industrial monolithic film (UV9-08311504) |
| UV9-C | 33.3 (1 5/16) | Breathable industrial monolithic film (UV9-08311505) |

TABLE 2

Release Rate by Orifice Size
Average Mass Loss (g)

| | Days | | | | | | |
|---|---|---|---|---|---|---|---|
| Prototype | 1 | 4 | 6 | 8 | 11 | 13 | 15 |
| Black-A | 0.00 | 0.00 | 0.00 | 0.00 | 0.00 | 0.00 | 0.01 |
| UV8-A | 0.31 | 0.30 | 0.32 | 0.35 | 0.40 | 0.30 | 0.37 |
| M-A | 0.03 | 0.04 | 0.05 | 0.06 | 0.07 | failed | failed |
| B + A | 0.03 | 0.04 | 0.05 | 0.05 | 0.06 | 0.10 | 0.24 |
| C 1.0-A | 0.02 | 0.01 | 0.02 | 0.03 | 0.02 | 0.03 | 0.08 |
| BII-A | 0.16 | 0.19 | 0.17 | 0.22 | 0.22 | 0.25 | 0.30 |
| UV9-A | 0.14 | 0.12 | 0.13 | 0.14 | 0.14 | 0.10 | 0.15 |
| Black-B | 0.01 | 0.00 | 0.00 | 0.00 | 0.00 | 0.00 | 0.00 |
| UV8-B | 1.14 | 1.23 | 1.24 | 1.42 | 1.51 | 1.16 | 1.27 |

TABLE 2-continued

| Release Rate by Orifice Size Average Mass Loss (g) | | | | | | | |
|---|---|---|---|---|---|---|---|
| | Days | | | | | | |
| Prototype | 1 | 4 | 6 | 8 | 11 | 13 | 15 |
| M-B | 0.05 | 0.16 | 0.19 | 0.23 | 0.24 | 0.17 | 0.45 |
| B+-B | 0.18 | NA | NA | NA | NA | NA | NA |
| C 1.0-B | 0.04 | 0.03 | 0.03 | 0.03 | 0.03 | 0.03 | 0.03 |
| BII-B | 0.48 | 0.55 | 0.51 | 0.57 | 0.59 | 0.46 | 0.50 |
| UV9-B | 0.32 | 0.33 | 0.31 | 0.34 | 0.36 | 0.29 | 0.33 |
| Black-C | 0.00 | 0.00 | 0.00 | 0.00 | 0.00 | −0.01 | 0.01 |
| UV8-C | 4.68 | 4.00 | 2.27 | 1.32 | 0.34 | 0.01 | 0.01 |
| M-C | 0.10 | 0.11 | 0.10 | 0.11 | 0.11 | 0.11 | 0.20 |
| B+-C | 1.09 | 1.22 | 1.10 | 1.17 | 1.20 | 0.93 | 0.90 |
| C 1.0-C | 0.23 | 0.26 | 0.25 | 0.27 | 0.28 | 0.23 | 0.25 |
| BII-C | 2.02 | 2.82 | 2.57 | 2.35 | 1.23 | 0.06 | 0.01 |
| UV9-C | 0.69 | 2.42 | 2.30 | 2.25 | 1.76 | 0.41 | 0.05 |
| Ctrl | 0.00 | 0.00 | 0.00 | 0.00 | 0.00 | 0.00 | 0.02 |
| Comp. Prod. 1 | 0.09 | 0.09 | 0.19 | 0.1 | 0.08 | 0.09 | 0.00 |
| WHF | 0.70 | 0.87 | 0.75 | 0.495 | 0.39 | NA | NA |

A: orifice size of 3.2 mm (1/8 in)
B: orifice size of 9.5 mm (3/8 in)
C: orifice size of 33.3 mm (1 5/16 in)

TABLE 3

| Release Rate by Membrane Type (FIG. 7-10) Average Loss (g) | | | | | | | |
|---|---|---|---|---|---|---|---|
| | Days | | | | | | |
| Membrane | 1 | 4 | 6 | 8 | 11 | 13 | 15 |
| Black-A | 0.00 | 0 | 0.00 | 0.00 | 0.00 | 0.00 | 0.01 |
| Black-B | 0.01 | 0.00 | 0.00 | 0.00 | 0.00 | 0.00 | 0.00 |
| Black-C | 0.00 | 0.00 | 0.00 | 0.00 | 0.00 | −0.01 | 0.01 |
| UV8-A | 0.31 | 0.30 | 0.32 | 0.35 | 0.40 | 0.30 | 0.37 |
| UV8-B | 1.14 | 1.23 | 1.24 | 1.42 | 1.51 | 1.16 | 1.27 |
| UV8-C | 4.68 | 4.00 | 2.27 | 1.32 | 0.34 | 0.01 | 0.01 |
| M-A | 0.03 | 0.04 | 0.05 | 0.06 | 0.07 | failed | Failed |
| M-B | 0.05 | 0.16 | 0.19 | 0.23 | 0.24 | 0.17 | 0.45 |
| M-C | 0.10 | 0.11 | 0.10 | 0.11 | 0.11 | 0.11 | 0.20 |
| B + A | 0.03 | 0.04 | 0.05 | 0.05 | 0.06 | 0.10 | 0.24 |
| B+-B | 0.18 | NA | NA | NA | NA | NA | NA |
| B+-C | 1.09 | 1.22 | 1.10 | 1.17 | 1.20 | 0.93 | 0.90 |
| C 1.0-A | 0.02 | 0.01 | 0.02 | 0.03 | 0.02 | 0.03 | 0.08 |
| C 1.0-B | 0.04 | 0.03 | 0.03 | 0.03 | 0.03 | 0.03 | 0.03 |
| C 1.0-C | 0.23 | 0.26 | 0.25 | 0.27 | 0.28 | 0.23 | 0.25 |
| BII-A | 0.16 | 0.19 | 0.17 | 0.22 | 0.22 | 0.25 | 0.30 |
| BII-B | 0.48 | 0.55 | 0.51 | 0.57 | 0.59 | 0.46 | 0.50 |
| BII-C | 2.02 | 2.82 | 2.57 | 2.35 | 1.23 | 0.06 | 0.01 |
| UV9-A | 0.14 | 0.12 | 0.13 | 0.14 | 0.14 | 0.10 | 0.15 |
| UV9-B | 0.32 | 0.33 | 0.31 | 0.34 | 0.36 | 0.29 | 0.33 |
| UV9-C | 0.69 | 2.42 | 2.30 | 2.25 | 1.76 | 0.41 | 0.05 |
| Ctrl | 0.00 | 0.00 | 0.00 | 0.00 | 0.00 | 0.00 | 0.02 |
| Comp. Prod. 1 | 0.09 | 0.09 | 0.19 | 0.10 | 0.08 | 0.09 | 0.00 |
| WHF | 0.70 | 0.87 | 0.75 | 0.495 | 0.39 | NA | NA |

A: orifice size of 3.2 mm (1/8 in)
B: orifice size of 9.5 mm (3/8 in)
C: orifice size of 33.3 mm (1 5/16 in)

TABLE 4

| Attractant Mass Loss by Orifice Size Average Mass Loss (g) | | | | | | | |
|---|---|---|---|---|---|---|---|
| | Days | | | | | | |
| Prototype | 1 | 4 | 6 | 8 | 11 | 13 | 15 |
| Black-A | 28.80 | 28.80 | 28.80 | 28.79 | 28.79 | 28.80 | 28.80 |
| UV8-A | 28.14 | 27.83 | 26.93 | 26.30 | 25.60 | 24.40 | 23.81 |
| M-A | 28.12 | 28.09 | 27.97 | 27.87 | 27.74 | 27.54 | 28.27 |

TABLE 4-continued

| Attractant Mass Loss by Orifice Size Average Mass Loss (g) | | | | | | | |
|---|---|---|---|---|---|---|---|
| | Days | | | | | | |
| Prototype | 1 | 4 | 6 | 8 | 11 | 13 | 15 |
| B + A | 28.23 | 28.20 | 28.08 | 27.98 | 27.89 | 27.72 | 27.52 |
| C 1.0-A | 28.04 | 28.02 | 27.97 | 27.93 | 27.88 | 27.81 | 27.76 |
| BII-A | 28.13 | 27.97 | 27.39 | 27.04 | 26.61 | 25.95 | 25.45 |
| UV9-A | 28.23 | 28.09 | 27.74 | 27.49 | 27.21 | 26.78 | 26.58 |
| Black-B | 28.85 | 28.84 | 28.84 | 28.84 | 28.84 | 28.85 | 28.84 |
| UV8-B | 28.09 | 26.96 | 23.26 | 20.78 | 17.95 | 13.42 | 11.10 |
| M-B | 28.02 | 27.98 | 27.49 | 27.12 | 26.67 | 25.96 | 25.62 |
| B+-B | 28.27 | 28.08 | NA | NA | NA | NA | NA |
| C 1.0-B | 28.06 | 28.02 | 27.92 | 27.85 | 27.78 | 27.68 | 27.62 |
| BII-B | 28.19 | 27.71 | 26.06 | 25.03 | 23.90 | 22.11 | 21.20 |
| UV9-B | 28.22 | 27.91 | 26.93 | 26.30 | 25.61 | 24.52 | 23.93 |
| Black-C | 28.81 | 28.81 | 28.81 | 28.80 | 28.79 | 28.79 | 28.80 |
| UV8-C | 27.95 | 23.27 | 11.27 | 6.74 | 4.09 | 3.06 | 3.05 |
| M-C | 27.99 | 27.89 | 27.55 | 27.34 | 27.13 | 26.79 | 26.57 |
| B+-C | 28.16 | 27.06 | 23.40 | 21.20 | 18.86 | 15.25 | 13.39 |
| C 1.0-C | 27.95 | 27.72 | 26.94 | 26.43 | 25.89 | 25.03 | 24.58 |
| BII-C | 26.42 | 24.40 | 16.81 | 11.67 | 6.97 | 3.28 | 3.15 |
| UV9-C | 26.54 | 25.85 | 18.59 | 14.00 | 9.50 | 4.21 | 3.40 |
| Ctrl | 27.80 | 27.80 | 27.80 | 27.79 | 27.79 | 27.79 | 27.78 |
| Comp. Prod. 1 | 14.03 | 14.03 | 13.75 | 13.36 | 13.06 | 12.90 | 12.71 |
| WHF | 16.04 | 15.34 | 13.61 | 11.36 | 10.37 | 9.59 | NA |

A: orifice size of 3.2 mm (1/8 in)
B: orifice size of 9.5 mm (3/8 in)
C: orifice size of 33.3 mm (1 5/16 in)

TABLE 5

Figure 11:
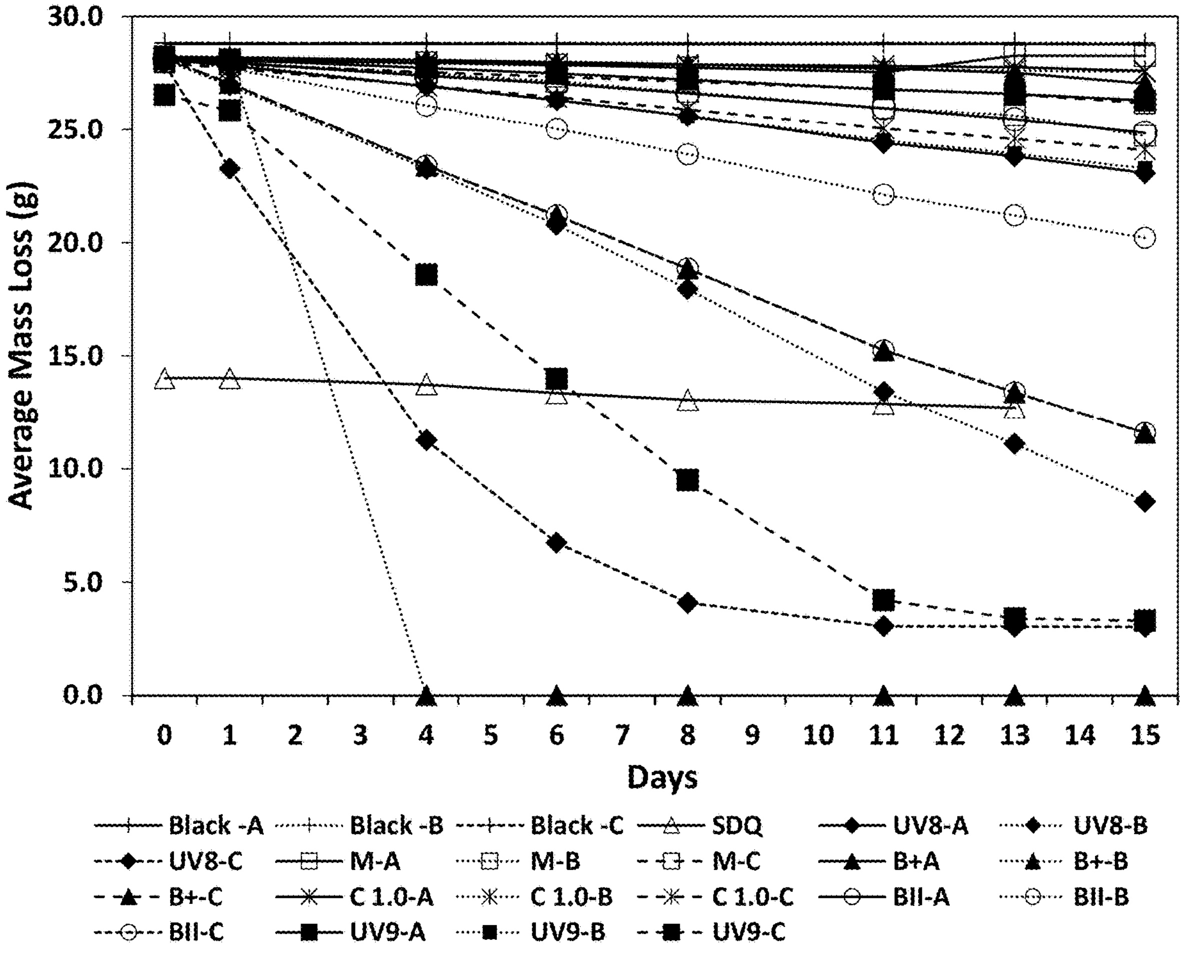
FIG. 11 shows the mass loss of ammonium carbonate with various membrane materials and various orifice sizes (Type-A: 3.2 mm (⅛ in); Type-B: 9.5 mm (⅜ in); Type-C: 33.3 mm (1 5/16 in)). Data are shown in Table 5.

| Attractant Mass Loss by Membrane Type (FIG. 11) Average Loss (g) | | | | | | | |
|---|---|---|---|---|---|---|---|
| | Days | | | | | | |
| Prototype | 1 | 4 | 6 | 8 | 11 | 13 | 15 |
| Black-A | 28.80 | 28.80 | 28.80 | 28.79 | 28.79 | 28.80 | 28.80 |
| Black-B | 28.85 | 28.84 | 28.84 | 28.84 | 28.84 | 28.85 | 28.84 |
| Black-C | 28.81 | 28.81 | 28.81 | 28.80 | 28.79 | 28.79 | 0.00 |
| UV8-A | 28.14 | 27.83 | 26.93 | 26.30 | 25.60 | 24.40 | 23.81 |
| UV8-B | 28.09 | 26.96 | 23.26 | 20.78 | 17.95 | 13.42 | 11.10 |
| UV8-C | 27.95 | 23.27 | 11.27 | 6.74 | 4.09 | 3.06 | 3.05 |
| M-A | 28.12 | 28.09 | 27.97 | 27.87 | 27.74 | 27.54 | 28.27 |
| M-B | 28.02 | 27.98 | 27.49 | 27.12 | 26.67 | 25.96 | 25.62 |
| M-C | 27.99 | 27.89 | 27.55 | 27.34 | 27.13 | 26.79 | 26.57 |
| B + A | 28.23 | 28.20 | 28.08 | 27.98 | 27.89 | 27.72 | 27.52 |
| B+-B | 28.27 | 28.08 | NA | NA | NA | NA | NA |
| B+-C | 28.16 | 27.06 | 23.40 | 21.20 | 18.86 | 15.25 | 13.39 |
| C 1.0-A | 28.04 | 28.02 | 27.97 | 27.93 | 27.88 | 27.81 | 27.76 |
| C 1.0-B | 28.06 | 28.02 | 27.92 | 27.85 | 27.78 | 27.68 | 27.62 |
| C 1.0-C | 27.95 | 27.72 | 26.94 | 26.43 | 25.89 | 25.03 | 24.58 |
| BII-A | 28.13 | 27.97 | 27.39 | 27.04 | 26.61 | 25.95 | 25.45 |
| BII-B | 28.19 | 27.71 | 26.06 | 25.03 | 23.90 | 22.11 | 21.20 |
| BII-C | 28.16 | 27.06 | 23.40 | 21.20 | 18.86 | 15.25 | 13.39 |
| UV9-A | 28.23 | 28.09 | 27.74 | 27.49 | 27.21 | 26.78 | 26.58 |
| UV9-B | 28.22 | 27.91 | 26.93 | 26.30 | 25.61 | 24.52 | 23.93 |
| UV9-C | 26.54 | 25.85 | 18.59 | 14.00 | 9.50 | 4.21 | 3.40 |
| Ctrl | 27.80 | 27.80 | 27.80 | 27.79 | 27.79 | 27.79 | 27.78 |
| Comp. Prod. 1 | 14.03 | 14.03 | 13.75 | 13.36 | 13.06 | 12.90 | 12.71 |
| WHF | 16.04 | 15.34 | 13.61 | 11.36 | 10.37 | 9.59 | NA |

A: orifice size of 3.2 mm (1/8 in)
B: orifice size of 9.5 mm (3/8 in)
C: orifice size 33.3 mm (1 5/16 in)

Example 2

All prototype lure devices (i.e., the attractant receptacle and permeable membrane with enclosed volatile insect attractant) were constructed using polypropylene/calcium carbonate film (UV8) for the permeable membrane and Scotchpak™ (3M) polyester laminate film for the impermeable barrier material. Each lure device measured approximately 11.5 cm×5.5 cm with a 1.6 mm (1/16 in) diameter spherical punch in the impermeable layer exposing the membrane and an ~8 mm (5/16 in) diameter heat seal around the circumference of the punch (referred to as a ring seal). Each prototype contained 15 g of one of the following ammonium salts as the volatile insect attractant: ammonium carbamate, ammonium carbonate, or ammonium bicarbonate. Prior to being deployed the lures were weighed on an analytical balance (Sartorius, Universal; resolution of 0.01 g). Prototype lures were attached to a cord that ran the length of ventilated laboratory fume hood, with 5-8 cm (2-3 in) separating each lure in an open, ventilated room at the indicated temperature (18-20° C. or 39-41° C.). Every 2-3 days the lures were removed from the cord and weighed on the same scale. Lure weight was recorded and the weight loss (g/day) was calculated. In addition to prototype lures, two controls were included in the study consisting of a current Suterra lure product (WHF lure) and a competitor product (Comp. Prod. 1).

Table 6 shows the release rate of ammonium carbonate or ammonium carbamate as a function of temperature. Table 7 shows the release rate of ammonium carbamate, ammonium carbonate, or ammonium bicarbonate as a function of temperature and the effect of a ring seal on the release rate of ammonium carbamate.

TABLE 6

Figure 12:
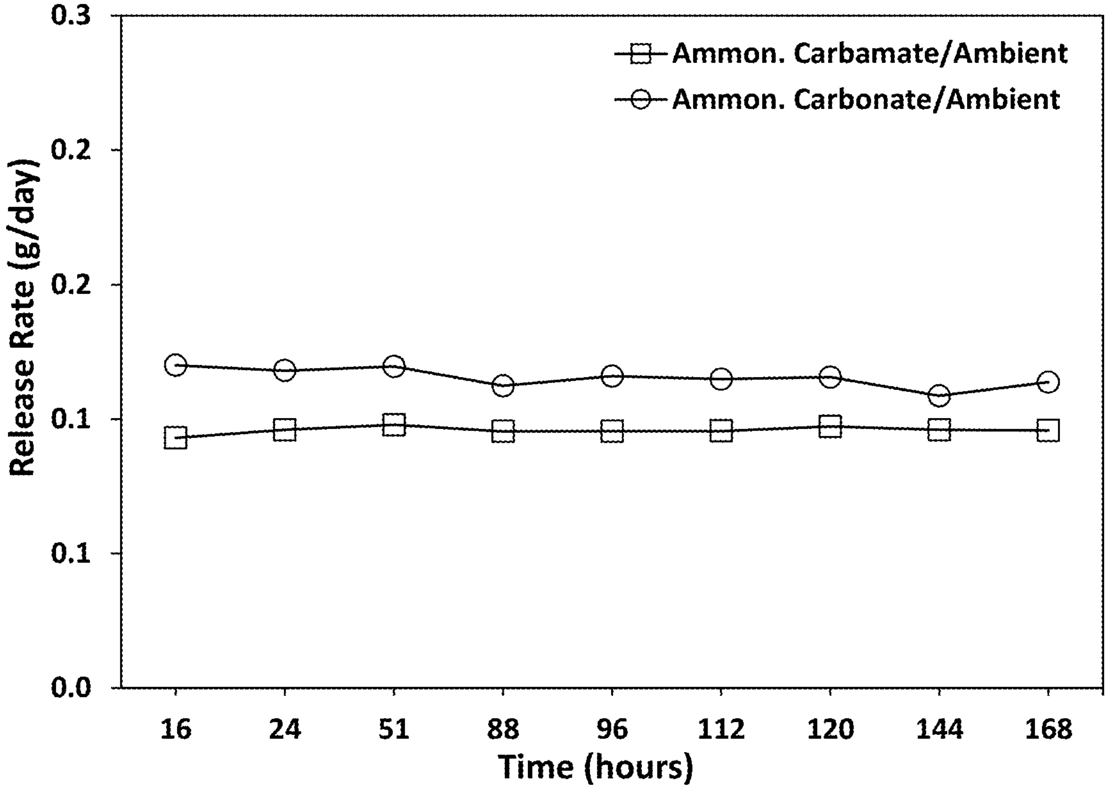
FIG. 12 shows the release rates of ammonium carbonate or ammonium carbamate at ambient temperature through a microporous polypropylene membrane (UV8) membrane with a 1.6 mm (1/16 in) orifice size. Data are shown in Table 6.
Figure 13:
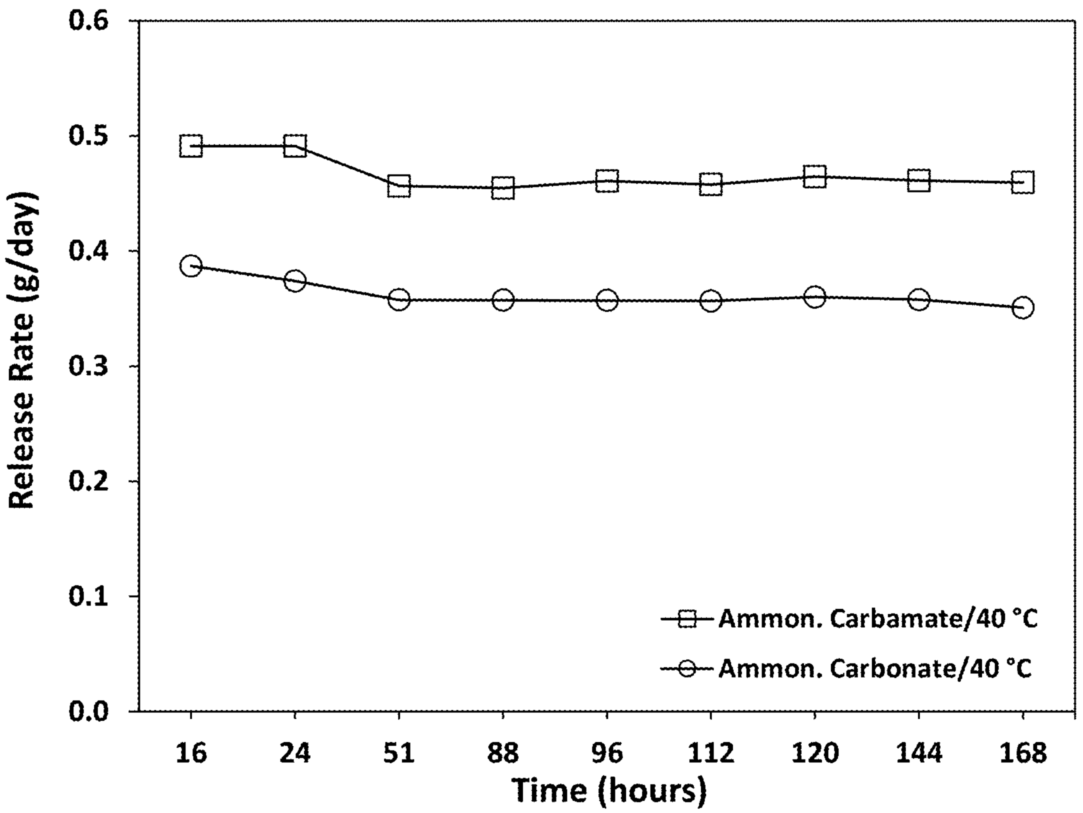
FIG. 13 shows the release rates of ammonium carbonate or ammonium carbamate at 40° C. through a microporous polypropylene membrane (UV8) with a 1.6 mm (1/16 in) orifice size. Data are shown in Table 6.

Ammonium Carbonate or Ammonium Carbamate Release Rates (FIG. 12-13)
Rate (g/day)

| | Hours | | | | | | | | |
|---|---|---|---|---|---|---|---|---|---|
| Attractant | 16 | 24 | 51 | 88 | 96 | 112 | 120 | 144 | 168 |
| Carbamate/Ambient | 0.09 | 0.10 | 0.10 | 0.10 | 0.10 | 0.10 | 0.10 | 0.10 | 0.10 |
| Carbamate/40 °C | 0.49 | 0.49 | 0.46 | 0.45 | 0.46 | 0.46 | 0.46 | 0.46 | 0.46 |
| Carbonate/Ambient | 0.12 | 0.12 | 0.12 | 0.11 | 0.12 | 0.11 | 0.12 | 0.11 | 0.11 |
| Carbonate/40 °C | 0.39 | 0.37 | 0.36 | 0.36 | 0.36 | 0.36 | 0.36 | 0.36 | 0.35 |
| Carbamate/Ambient | 0.00 | 0.01 | 0.00 | 0.02 | 0.02 | 0.02 | 0.00 | 0.00 | 0.00 |
| Carbamate/40 °C | 0.02 | 0.01 | 0.01 | 0.04 | 0.06 | 0.08 | 0.09 | 0.11 | 0.13 |
| Carbonate/Ambient | 0.01 | 0.01 | 0.04 | 0.06 | 0.07 | 0.08 | 0.08 | 0.08 | 0.11 |
| Carbonate/40 °C | 0.02 | 0.03 | 0.05 | 0.09 | 0.09 | 0.10 | 0.11 | 0.13 | 0.15 |

TABLE 7

Figure 14:
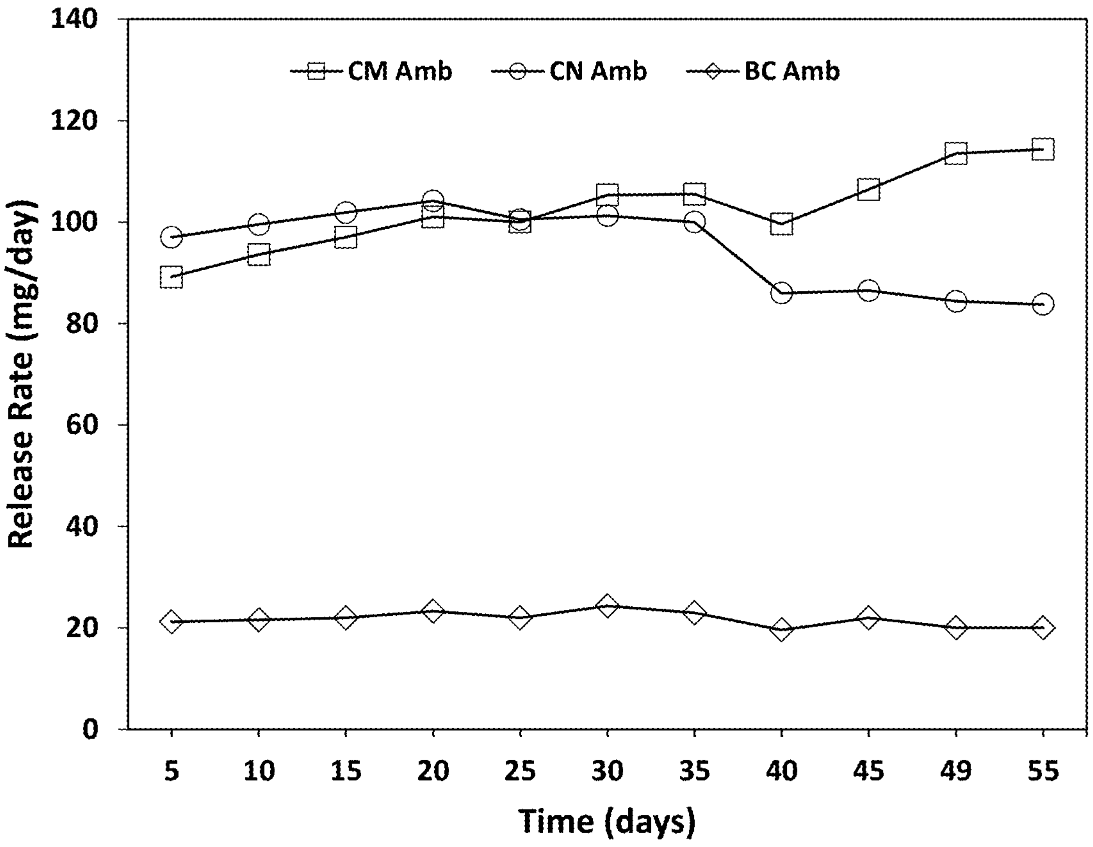
FIG. 14 shows the release rates of ammonium carbonate, ammonium carbamate, or ammonium bicarbonate at ambient temperature through a microporous polypropylene membrane (UV8) membrane with a 1.6 mm (1/16 in) orifice size. Data are shown in Table 7.
Figure 15:
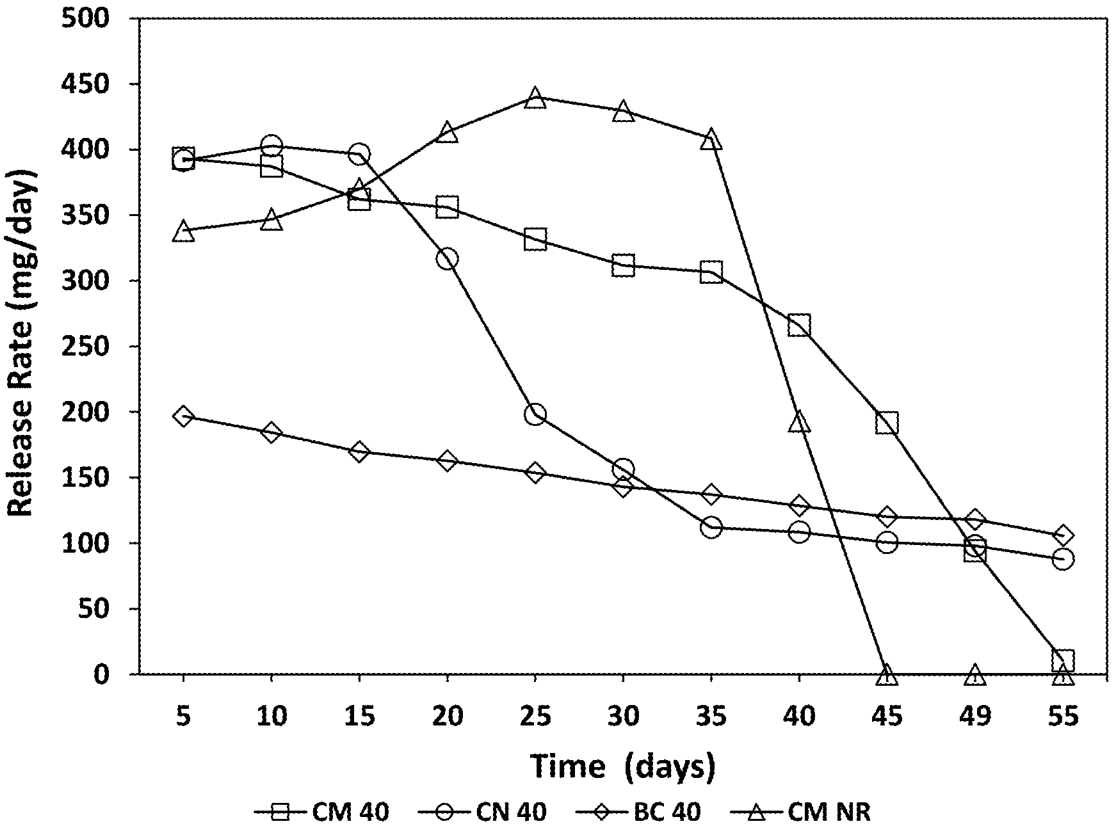
FIG. 15 shows the release rates of ammonium carbonate, ammonium carbamate or ammonium bicarbonate at 40° C. through a microporous polypropylene membrane (UV8) with a 1.6 mm (1/16 in) orifice size. Data are shown in Table 7.

Attractant Release Rates (FIG. 14-15)
mg/day (5-day average per time point)

| Attrac. | 5 | 10 | 15 | 20 | 25 | 30 | 35 | 40 | 45 | 49 | 55 |
|---|---|---|---|---|---|---|---|---|---|---|---|
| Ambient Temperature (FIG. 14) | | | | | | | | | | | |
| CM | 89.2 | 93.6 | 97.0 | 101.0 | 100.0 | 105.3 | 105.5 | 99.6 | 106.4 | 113.5 | 114.3 |
| CN | 97 | 99.5 | 101.9 | 104.2 | 100.5 | 101.3 | 100.0 | 86.0 | 86.5 | 84.4 | 83.8 |
| BC | 21.2 | 21.6 | 22.0 | 23.3 | 22.0 | 24.3 | 23.0 | 19.6 | 22.0 | 20.0 | 20.0 |
| CM | 393.2 | 387.2 | 362.0 | 356.0 | 331.6 | 311.7 | 306.5 | 266.0 | 191.6 | 94.0 | 10.3 |
| 40 °C (FIG. 15) | | | | | | | | | | | |
| CN | 391.6 | 402.8 | 396.5 | 316.7 | 198.0 | 156.0 | 112.0 | 108.4 | 100.4 | 98.0 | 87.7 |
| BC | 196.8 | 184.4 | 169.5 | 162.7 | 153.6 | 143.0 | 137.0 | 128.4 | 120.0 | 118.0 | 105.7 |
| CM-NR* | 338.4 | 346.8 | 370.0 | 413.7 | 440.0 | 429.7 | 408.5 | 193.2 | 0.0 | 0.0 | 0.0 |

CM: Ammonium carbamate;
CN: Ammonium carbonate;
BC: Ammonium bicarbonate;
CM-NR: Ammonium carbamate without a ring seal.

Example 3

Attractant Release in Field Trials

The attract and kill devices as described herein were deployed in olive orchards in Cordoba, Spain. The devices consisted of a pesticide coated insecticide transfer envelope (~10 mg of deltamethrin) equipped with a hook containing an attractant lure on the inside of the envelope (see FIG. 3). Attractant lures inside Magnet™ ORO were labelled and individually weighed at different periods of time. Qualitative identity of the remaining material was assessed by means of FTIR and compared with standards. Each lure was constructed using polypropylene/calcium carbonate film (UV8) as the membrane and Scotchpak™ (3M) polyester laminate film as the impermeable barrier material and a 1.6 mm (1/16 in) diameter spherical punch in the impermeable layer exposing the membrane and an ~8 mm (5/16 in) diameter heat seal around the circumference of the punch (referred to as a ring seal). Each prototype contained 15 g of ammonium carbonate as the volatile insect attractant.

Table 8 shows field trial results for the mass loss of ammonium carbonate using an attractant receptacle comprising Scotchpak™ (3M) polyester laminate film with an Aptra UV8 permeable membrane with an orifice size of 1.6 mm (1/16 in). The trials were performed in Córdoba, Spain June-November 2019 where the average temperatures (high/low) are 32/17° C. (90/62° F.) in June, 37/19° C. (98/67° F.)

in July, 35/19° C. (95/66° F.) in August, 32/18° C. (90/64° F.) in September, 24/13° C. (76/55° F.) in October, and 18/8° C. (65/47° F.) in November.

TABLE 8

Figures 16A, 16B:
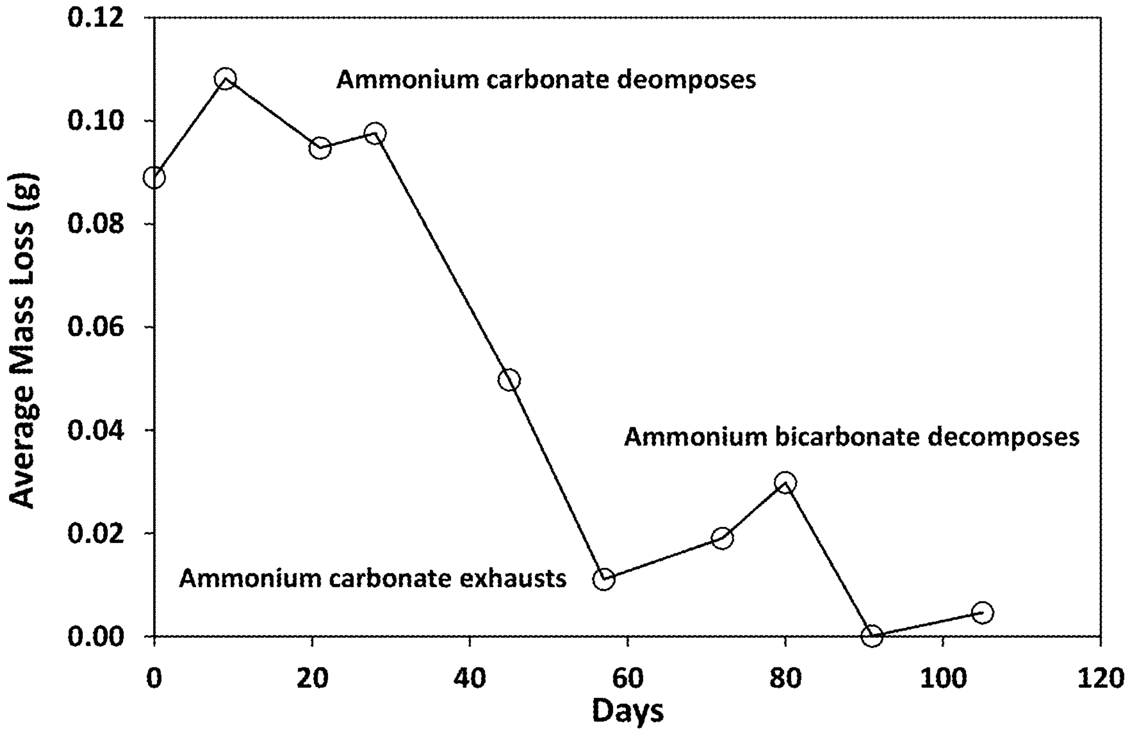
FIG. 16A-B show field trial results of an attractant system containing ammonium carbonate as the attractant.

Field Trial Ammonium Carbonate Mass Loss Over Time (FIG. 16)

| Dates | Days | Average Mass Loss (g/day) |
|---|---|---|
| 22 Jul. 2019 | 0 | 0.0890 |
| 31 Jul. 2019 | 9 | 0.1082 |
| 12 Aug. 2019 | 21 | 0.0948 |
| 19 Aug. 2019 | 28 | 0.0976 |
| 5 Sep. 2019 | 45 | 0.0498 |
| 17 Sep. 2019 | 57 | 0.0111 |
| 2 Oct. 2019 | 72 | 0.0191 |
| 10 Oct. 2019 | 80 | 0.0299 |
| 21 Oct. 2019 | 91 | 0.0001 |
| 4 Nov. 2019 | 105 | 0.0046 |

Initial ammonium carbonate amount: 15 g
Field trial performed in Córdoba, Spain June-November 2019

Example 4

Attractant Release in Field Trials

Figure 17A:
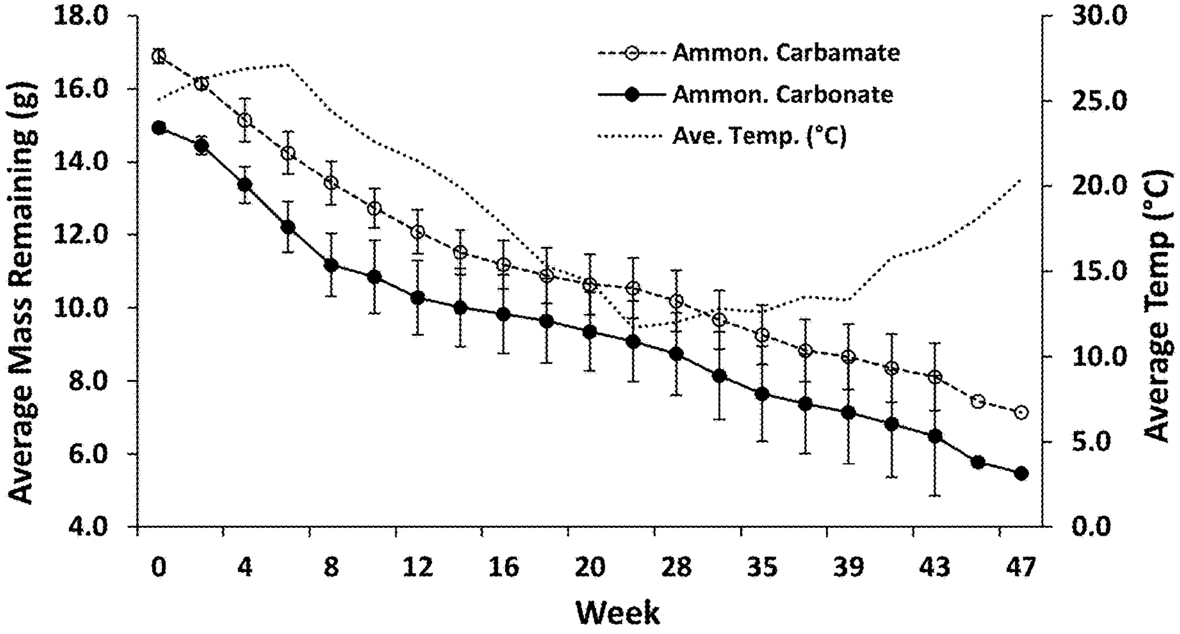
FIG. 17A-D show field trial results of an attractant system containing ammonium carbonate as the attractant.
Figure 17B:
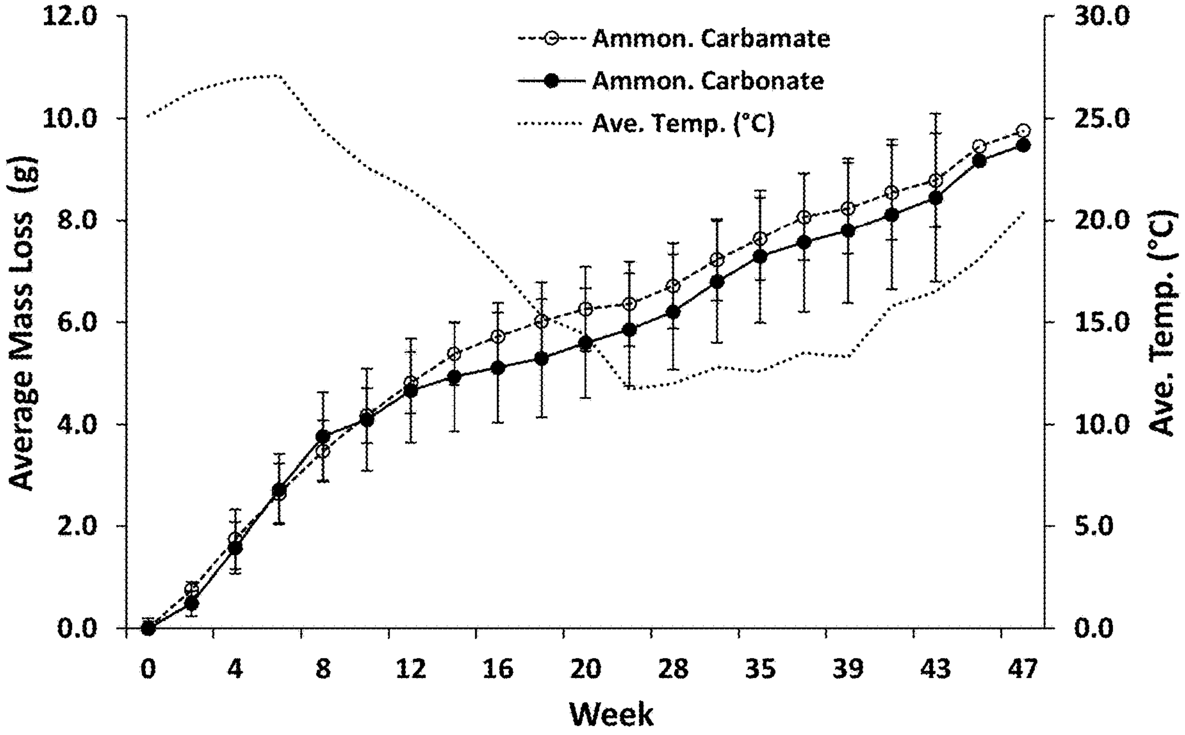
Figure 17C:
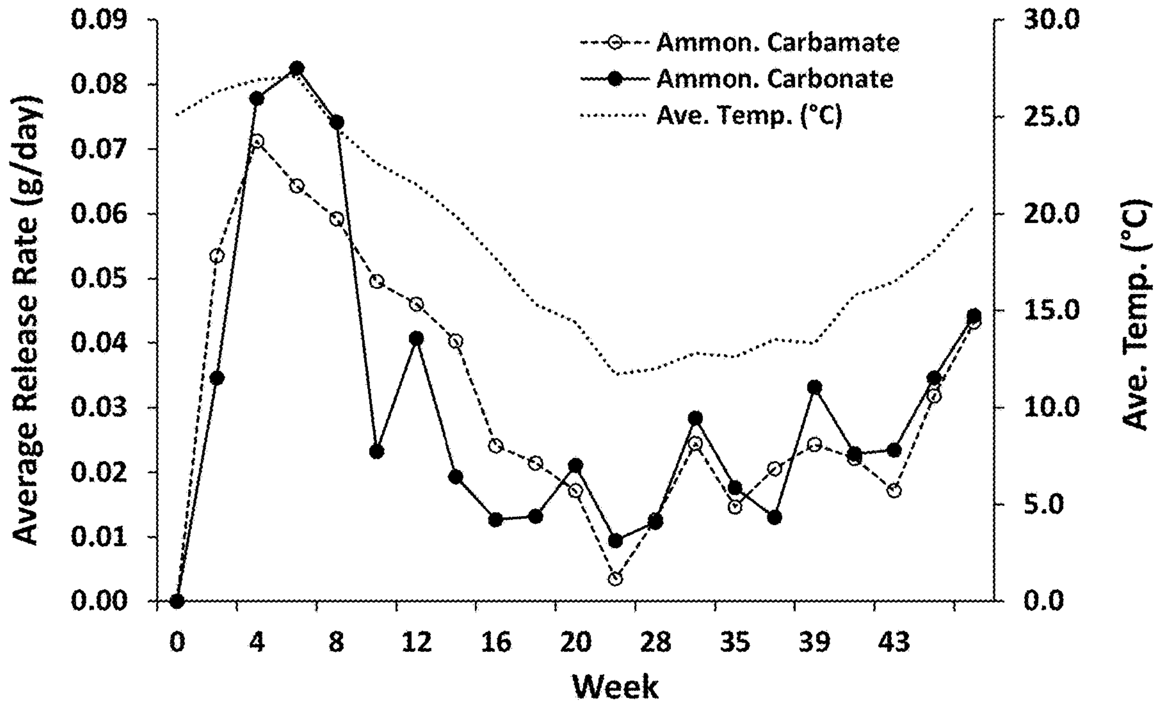
Figure 17D:
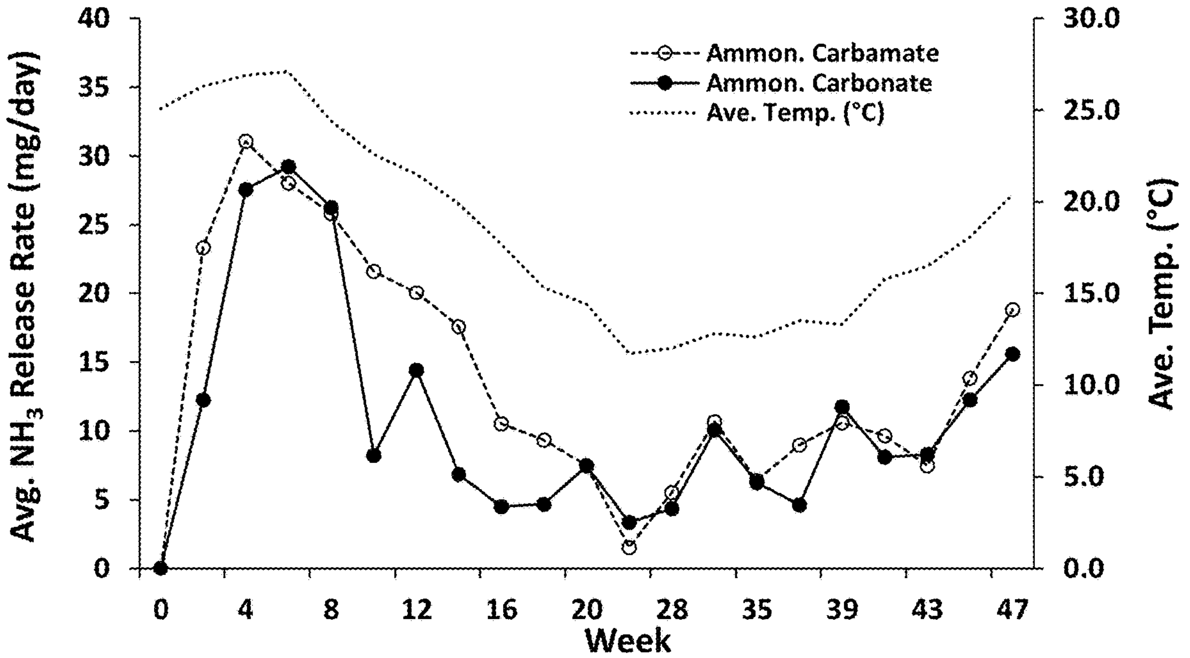

The attract and kill devices as described herein were deployed in olive orchards in Valencia, Spain in July 2020 with attractant receptacles comprising Scotchpak™ (3M) polyester laminate film with an Aptra UV8 permeable membrane with an orifice size of 1.6 mm (1/16 in) and either ammonium carbonate or ammonium carbamate as the attractant. Every two weeks samples of the attractant were weighed to determine the mass. From the mass, the mass that had been released, the mass remaining, and the amount of ammonia released was determined. Table 9 shows the average temperature for the period, the average mass remaining, and the average mass loss of ammonium carbamate and ammonium carbonate over 43 weeks. The trial is ongoing. Graphical representations of the data are shown in FIG. 17A-B. Table 10 shows the average release rate (g/day) and average ammonia release rate for the same data shown in Table 9. Graphical representations of the data are shown in FIG. 17C-D.

TABLE 9

Average Mass Loss of Attractant in Field Trails for 43 weeks* (FIG. 17A-B)

| | | Ammonium Carbamate | | | Ammonium Carbonate | | |
|---|---|---|---|---|---|---|---|
| Week | Ave. Temp. (°C) | Avg. Mass Remaining (g) | Std. Dev. | Avg. Mass Loss (g) | Avg. Mass Remaining (g) | Std. Dev. | Avg. Mass Loss (g) |
| 0 | 25.10 | 16.90 | 0.20 | 0.00 | 14.94 | 0.14 | 0.00 |
| 2 | 26.30 | 16.15 | 0.16 | 0.75 | 14.46 | 0.25 | 0.48 |
| 4 | 26.90 | 15.15 | 0.59 | 1.75 | 13.37 | 0.51 | 1.57 |
| 6 | 27.10 | 14.25 | 0.59 | 2.65 | 12.21 | 0.70 | 2.73 |
| 8 | 24.40 | 13.42 | 0.60 | 3.48 | 11.17 | 0.86 | 3.77 |
| 10 | 22.60 | 12.72 | 0.54 | 4.17 | 10.85 | 1.00 | 4.09 |
| 12 | 21.50 | 12.08 | 0.60 | 4.82 | 10.28 | 1.02 | 4.66 |
| 14 | 19.90 | 11.52 | 0.61 | 5.38 | 10.01 | 1.07 | 4.93 |
| 16 | 17.70 | 11.18 | 0.66 | 5.72 | 9.83 | 1.08 | 5.11 |
| 18 | 15.30 | 10.88 | 0.76 | 6.02 | 9.64 | 1.16 | 5.30 |
| 20 | 14.40 | 10.64 | 0.83 | 6.26 | 9.35 | 1.07 | 5.59 |
| 24 | 11.70 | 10.54 | 0.83 | 6.36 | 9.08 | 1.10 | 5.86 |
| 28 | 12.00 | 10.19 | 0.83 | 6.71 | 8.74 | 1.13 | 6.20 |
| 31 | 12.80 | 9.67 | 0.80 | 7.22 | 8.14 | 1.20 | 6.80 |
| 35 | 12.60 | 9.26 | 0.81 | 7.63 | 7.65 | 1.30 | 7.29 |
| 38 | 13.50 | 8.83 | 0.85 | 8.07 | 7.38 | 1.36 | 7.56 |
| 39 | 13.30 | 8.66 | 0.89 | 8.24 | 7.14 | 1.42 | 7.80 |
| 41 | 15.80 | 8.35 | 0.93 | 8.55 | 6.82 | 1.47 | 8.12 |
| 43 | 16.50 | 8.11 | 0.92 | 8.79 | 6.50 | 1.65 | 8.44 |
| 46 | 18.10 | 7.44 | 0.80 | 9.45 | 5.77 | 1.76 | 9.17 |
| 47 | 20.40 | 7.14 | 0.75 | 9.75 | 5.46 | 1.73 | 9.48 |

*This field trial is ongoing.

TABLE 10

Average Ammonia Release Rate in Field Trials for 43 weeks* (FIG. 17C-D)

| | | Ammonium Carbamate | | | | Ammonium Carbonate | | | |
|---|---|---|---|---|---|---|---|---|---|
| Week | Temp. Ave. (°C) | Avg. Release Rate (g/day) | Std. Dev. | Avg. $NH_3$ Release Rate (g/day) | Std. Dev. | Avg. Release Rate (g/day) | Std. Dev. | Avg. $NH_3$ Release Rate (g/day) | Std. Dev. |
| 0 | 25.10 | 0.000 | 0.000 | 0.00 | 0.00 | 0.000 | 0.000 | 0.00 | 0.00 |
| 2 | 26.30 | 0.054 | 0.015 | 23.35 | 6.46 | 0.035 | 0.017 | 12.24 | 5.92 |
| 4 | 26.90 | 0.071 | 0.043 | 31.07 | 18.69 | 0.078 | 0.024 | 27.57 | 8.41 |
| 6 | 27.10 | 0.064 | 0.008 | 28.04 | 3.51 | 0.083 | 0.017 | 29.23 | 5.96 |
| 8 | 24.40 | 0.059 | 0.019 | 25.83 | 8.34 | 0.074 | 0.019 | 26.27 | 6.71 |
| 10 | 22.60 | 0.050 | 0.022 | 21.61 | 9.72 | 0.023 | 0.019 | 8.22 | 6.61 |
| 12 | 21.50 | 0.046 | 0.013 | 20.04 | 5.76 | 0.041 | 0.018 | 14.41 | 6.38 |
| 14 | 19.90 | 0.040 | 0.005 | 17.57 | 2.10 | 0.019 | 0.009 | 6.85 | 3.33 |
| 16 | 17.70 | 0.024 | 0.005 | 10.51 | 2.28 | 0.013 | 0.001 | 4.50 | 0.42 |
| 18 | 15.30 | 0.021 | 0.012 | 9.34 | 5.18 | 0.013 | 0.006 | 4.67 | 2.27 |
| 20 | 14.40 | 0.017 | 0.007 | 7.47 | 2.95 | 0.021 | 0.007 | 7.46 | 2.48 |
| 24 | 11.70 | 0.004 | 0.003 | 1.53 | 1.10 | 0.009 | 0.003 | 3.35 | 1.07 |
| 28 | 12.00 | 0.013 | 0.005 | 5.51 | 2.30 | 0.012 | 0.002 | 4.35 | 0.81 |
| 31 | 12.80 | 0.024 | 0.007 | 10.67 | 2.92 | 0.028 | 0.007 | 10.05 | 2.50 |
| 35 | 12.60 | 0.015 | 0.008 | 6.38 | 3.38 | 0.018 | 0.008 | 6.25 | 2.82 |
| 38 | 13.50 | 0.021 | 0.005 | 8.97 | 2.20 | 0.013 | 0.005 | 4.62 | 1.90 |
| 39 | 13.30 | 0.024 | 0.021 | 10.59 | 9.20 | 0.033 | 0.011 | 11.74 | 3.94 |

TABLE 10-continued

Average Ammonia Release Rate in Field Trials for 43 weeks* (FIG. 17C-D)

| | | Ammonium Carbamate | | | | Ammonium Carbonate | | | |
|---|---|---|---|---|---|---|---|---|---|
| Week | Temp. Ave. (°C) | Avg. Release Rate (g/day) | Std. Dev. | Avg. $NH_3$ Release Rate (g/day) | Std. Dev. | Avg. Release Rate (g/day) | Std. Dev. | Avg. $NH_3$ Release Rate (g/day) | Std. Dev. |
| 41 | 15.80 | 0.022 | 0.006 | 9.65 | 2.58 | 0.023 | 0.007 | 8.10 | 2.37 |
| 43 | 16.50 | 0.017 | 0.010 | 7.47 | 4.15 | 0.023 | 0.014 | 8.30 | 5.07 |
| 46 | 18.10 | 0.032 | 0.011 | 13.82 | 4.76 | 0.035 | 0.009 | 12.24 | 3.23 |
| 47 | 20.40 | 0.043 | 0.012 | 18.81 | 5.45 | 0.044 | 0.024 | 15.58 | 8.39 |

*This field trial is ongoing.

Example 5

Efficacy Field Trials

The attract and kill devices as described herein were deployed in olive orchards in Córdoba, Castello de la Plana, Zaragoza, and Teruel, Spain (ES); Avis and Moura, Portugal (PT); Puglia and Sicilia, Italy (IT); and Crete, Greece (GR) over the 2018-2020 growing seasons. Devices were deployed in mid-June, before the fruits became sensitive to attack from flies. Two different deployment densities (50 units/hectare or 100 units/hectare) were compared to a control/reference plot. Control plots included untreated groves and full standard chemical treatment programs. All treatment control plots received equivalent or greater insecticide treatments than the experimental plots containing the attract and kill devices. Samples of the fruits were evaluated and damage due to the insects (olive fruit fly) was assessed and expressed as percent efficacy, i.e., the percentage of damage reduction versus the control plots.

The attract and kill devices as described herein were also deployed in walnut groves in Durham and Chico, California (US) during the 2020 growing season at a density of 50 units/ha or 100 units/ha in addition to standard pest control practices. Nuts were evaluated and damage due to the insects (walnut husk fly) was recorded and expressed as percent efficacy, i.e., the percentage of damage reduction versus the control plots.

The attract and kill devices as described herein leads to lower olive and walnut damage levels as compared to industry standard treatments. Data are summarized in Table 11 (olives) and Table 12 (walnuts) and graphical representations are shown in FIG. 18A (olives) and FIG. 18B (walnuts).

TABLE 11

Figure 18A:
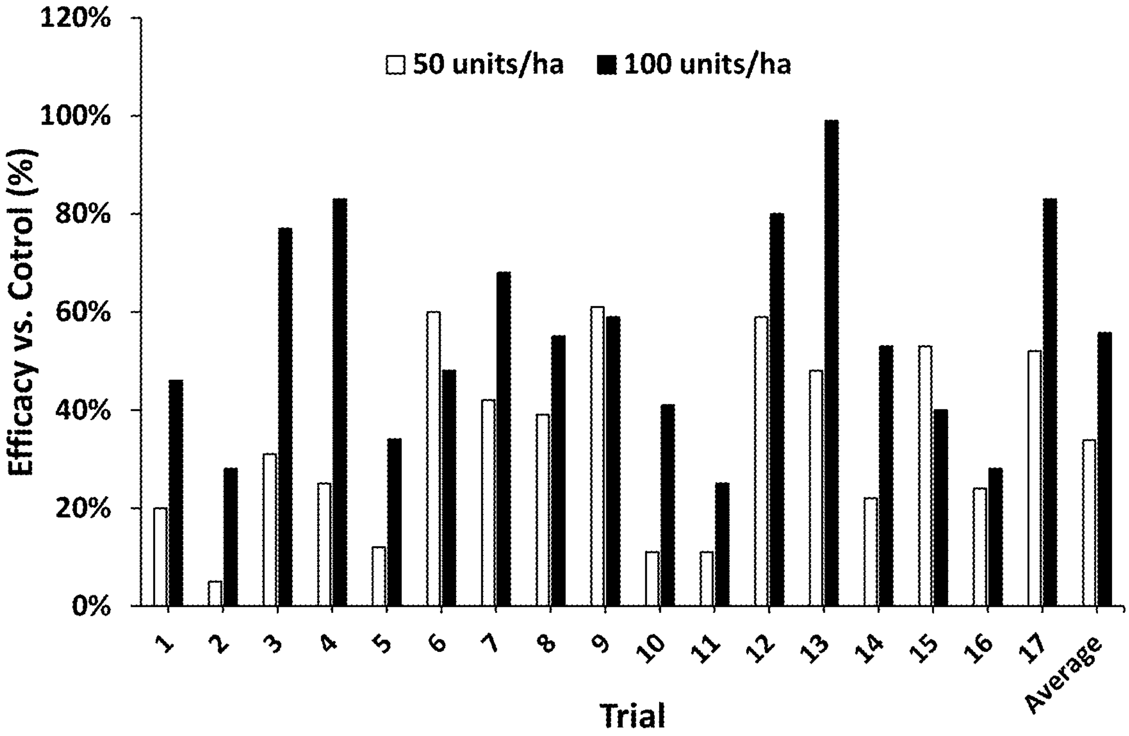
FIG. 18A-B show the efficacy of the attractant system in olive groves (FIG. 18A) or walnut groves (FIG. 18 B) at two distribution levels (50 units/hectare or 100 units/hectare) over a period of 43 weeks (ongoing).

Olive Grove Field Trials with Olive Fruit Fly (trials ongoing) (FIG. 18A)

| | | | Efficacy vs. Control (%) | |
|---|---|---|---|---|
| Trial | Year | Location | 50 units/ha | 100 units/ha |
| 1 | 2018 | Castellon, ES | 20 | 46 |
| 2 | 2018 | Castellon, ES | 5 | 28 |
| 3 | 2018 | Cordoba, ES | 31 | 77 |
| 4 | 2018 | Cordoba, ES | 25 | 83 |
| 5 | 2018 | Zaragoza, ES | 12 | 34 |
| 6 | 2018 | Zaragoza, ES | 60 | 48 |
| 7 | 2018 | Teruel, ES | 42 | 68 |
| 8 | 2018 | Teruel, ES | 39 | 55 |
| 9 | 2018 | Teruel, ES | 61 | 59 |
| 10 | 2019 | Cordoba, ES | 11 | 41 |
| 11 | 2019 | Crete, GR | 11 | 25 |

TABLE 11-continued

Olive Grove Field Trials with Olive Fruit Fly (trials ongoing) (FIG. 18A)

| | | | Efficacy vs. Control (%) | |
|---|---|---|---|---|
| Trial | Year | Location | 50 units/ha | 100 units/ha |
| 12 | 2019 | Puglia, IT | 59 | 80 |
| 13 | 2019 | Avis, PT | 48 | 99 |
| 14 | 2019 | Moura, PT | 22 | 53 |
| 15 | 2019 | Sicilia, IT | 53 | 40 |
| 16 | 2020 | Cordoba, ES | 24 | 28 |
| 17 | 2020 | Cordoba, ES | 52 | 83 |
| Average | | | 34% | 56% |

TABLE 12

Figure 18B:
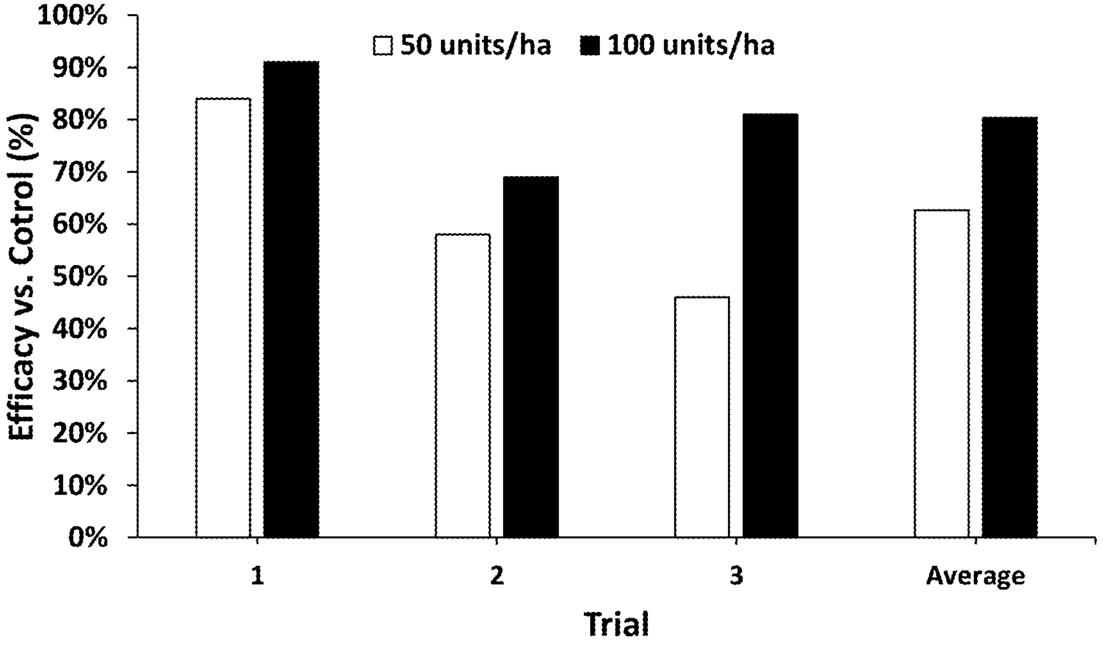

Walnut Grove Field Trials with Walnut Husk Fly (FIG. 18B)

| | | | Efficacy vs. Control (%) | |
|---|---|---|---|---|
| Trial | Year | Location | 50 units/ha | 100 units/ha |
| 1 | 2020 | Durham, CA, US | 84 | 91 |
| 2 | 2020 | Chico, CA, US | 58 | 69 |
| 3 | 2020 | Chico, CA, US | 46 | 81 |
| Average | | | 63% | 80% |

What is claimed:

1. A system for attracting insects, the system comprising:

an attractant receptacle enclosing a quantity of a volatile insect attractant, the receptacle comprising one or more orifices having a defined diameter of about 1 mm to about 5 mm, the one or more orifices being covered by a permeable membrane comprising polypropylene and calcium carbonate;

where the receptacle passively releases the volatile insect attractant through the permeable membrane covering the one or more orifices; and the quantity of the volatile insect attractant is released over a period of about 30 days to about 480 days.

2. The system of claim 1, wherein the volatile insect attractant is released at a rate of about 1 mg to about 800 mg per day.

3. The system of claim 1, wherein the volatile insect attractant comprises one or more of ammonium carbonate, ammonium carbamate, ammonium bicarbonate, ammonium phosphate, ammonium nitrate, ammonium sulfate, ammonium persulfate, ammonium perchlorate, ammonium acetate, ammonium lactate, ammonium citrate, or other ammonium salts.

4. The system of claim 1, wherein the volatile insect attractant comprises one or more of ammonium carbonate, ammonium carbamate, or ammonium bicarbonate.

5. The system of claim 1, wherein the quantity of the volatile insect attractant comprises about 5 g to about 100 g.

6. The system of claim 1, wherein the defined diameter of the orifice is about 2 mm to about 4 mm.

7. The system of claim 1, wherein the permeable membrane is affixed it to the attractant receptacle with a ring seal.

8. The system of claim 1, wherein the attractant receptacle comprises a sealable sleeve comprising one or more of polyvinyl chloride, polyester, polyethylene, polypropylene, polyethylene terephthalate, polyether ether ketone, fluoropolymer, ethylene vinyl acetate, nylon, or aluminum.

9. The system of claim 1, wherein the attractant receptacle comprises a sealable sleeve comprising polyvinyl chloride, polyethylene, or polyester.

10. The system of claim 1, wherein:
- the attractant receptacle comprises a sealable sleeve comprising polyethylene or polyester;
- the receptacle comprises one or more orifices having a defined diameter of about 2 mm to about 4 mm;
- the volatile insect attractant comprises about 5 g to about 25 g of one or more of ammonium carbonate, ammonium carbamate, or ammonium bicarbonate;
- the volatile insect attractant is released over a period of about 30 days to about 480 days; and
- the volatile insect attractant is released at a rate of about 1 mg to about 800 mg per day.

11. A method for attracting insects, the method comprising:
- releasing a quantity of volatile insect attractant from a receptable comprising one or more membranous orifices having a defined diameter of about 1 mm to about 5 mm, the one or more orifices being covered by a permeable membrane comprising polypropylene and calcium carbonate;
- wherein the quantity of the volatile insect attractant is released over a period of about 30 days to about 480 days; and
- the volatile insect attractant is released at a rate of about 1 mg to about 800 mg per day.

12. The method of claim 11, wherein the receptacle comprises a sealable sleeve comprising polyethylene and polyester.

13. The method of claim 11, wherein the receptacle comprises one or more orifices having a defined diameter of about 2 mm to about 4 mm.

14. The method of claim 11, wherein the volatile insect attractant comprises about 5 g to about 25 g of one or more of ammonium carbonate, ammonium carbamate, or ammonium bicarbonate.

15. The method of claim 11, wherein the insects comprise one or more of the genera *Anastrepha, Bactrocera, Ceratitis, Dacus, Drosophila, Rhagoletis*, or *Vidalia.*

16. The method of claim 11, wherein the insects comprise one or more of South American fruit fly (*Anastrepha fraterculus*), Mexican fruit fly (*Anastrepha ludens*), Oriental fruit fly (*Bactrocera dorsalis*), Melon fly (*Bactrocera cucurbitae*), Olive fruit fly (*Bactrocera oleae*), Queensland fruit fly (*Bactrocera tryoni*), Peach fruit fly (*Bactrocera zonata*), Mediterranean fruit fly (*Ceratitis capitata*), common fruit fly, (*Drosophila melanogaster*), Spotted-wing *drosophila* (*Drosophila suzukii*), European cherry fruit fly (*Rhagoletis cerasi*), Walnut husk fly (*Rhagoletis* complete), or apple maggot (*Rhagoletis pomonella*).

17. A kit for attracting insects comprising:
- an attractant receptable enclosing a quantity of a volatile insect attractant, the attractant receptacle comprising one or more orifices of a defined diameter, the one or more orifices being covered by a permeable membrane; the permeable membrane being covered by a removable seal;
- a sealed package for enclosing the attractant receptacle;
- optionally, instructions or directions for use.

18. A kit for attracting and killing insects comprising:
- an insecticide transfer envelope comprising exterior and interior surfaces, with an insecticide disposed on the exterior surfaces;
- an attractant receptable enclosing a quantity of a volatile insect attractant, the attractant receptacle comprising one or more orifices of a defined diameter of about 1 mm to about 5 mm, the one or more orifices being covered by a permeable membrane comprising polypropylene and calcium carbonate, where the receptacle passively releases the volatile insect attractant through the permeable membrane covering the one or more orifices, and the volatile insect attractant is released over a period of about 30 days to about 480 days; the permeable membrane being covered by a removable seal;
- a sealed package for enclosing the attractant receptacle; and
- optionally, instructions or directions for use.

19. A method for attracting and killing insects, the method comprising:
- deploying in a field a system for attracting and killing insects comprising:
  - an insecticide transfer envelope comprising exterior and interior surfaces, with an insecticide immobilized on the exterior surface, and enclosing within the interior an attractant receptacle enclosing a quantity of a volatile insect attractant, the attractant receptacle comprising one or more orifices having a defined diameter of about 1 mm to about 5 mm, the one or more orifices being covered by a permeable membrane comprising polypropylene and calcium carbonate;
  - where the receptacle passively releases the volatile insect attractant through the permeable membrane covering the one or more orifices;
  - the volatile insect attractant is released over a period of about 30 days to about 480 days; and
- attracting insects to the exterior insecticide transfer surface having one or more insecticides dispersed thereon by passively releasing the volatile insect attractant from the attractant receptable, whereby when an insect contacts the exterior insecticide transfer surface, insecticide is transferred to the insect and effectuates the killing of the insect.

* * * * *